(12) United States Patent
Tichelaar

(10) Patent No.: US 12,125,183 B2
(45) Date of Patent: Oct. 22, 2024

(54) HIGH DYNAMIC RANGE VIDEO COLOR REMAPPING

(71) Applicant: KONINKLIJKE PHILIPS N.V., Eindhoven (NL)

(72) Inventor: Johannes Yzebrand Tichelaar, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 392 days.

(21) Appl. No.: 17/511,718

(22) Filed: Oct. 27, 2021

(65) Prior Publication Data

US 2022/0124293 A1    Apr. 21, 2022

Related U.S. Application Data

(63) Continuation of application No. 16/770,133, filed as application No. PCT/EP2018/083856 on Dec. 6, 2018, now Pat. No. 11,170,478.

(30) Foreign Application Priority Data

Dec. 8, 2017  (EP) ..................... 17206169

(51) Int. Cl.
*G06K 9/00* (2022.01)
*G06T 5/92* (2024.01)
(Continued)

(52) U.S. Cl.
CPC .................. *G06T 5/92* (2024.01); *G06T 7/90* (2017.01); *G06T 9/00* (2013.01); *H04N 9/643* (2013.01);
(Continued)

(58) Field of Classification Search
CPC ....... G06T 5/90–94; G06T 2207/20208; G06T 9/00–40; H04N 19/98; H04N 9/68;
(Continued)

(56) References Cited

U.S. PATENT DOCUMENTS 10,075,728 B2   9/2018   Guillemot
10,075,738 B2   9/2018   Van Der Vleuten et al.
(Continued)

FOREIGN PATENT DOCUMENTS

WO     2015180854 A1   12/2015
WO     20170157977 A1   9/2017

OTHER PUBLICATIONS

International Search Report and Written Opinion from PCT/EP2018/083856 mailed Feb. 11, 2019.

*Primary Examiner* — Atiba O Fitzpatrick

(57) ABSTRACT

To allow a better determination of an image of a different luminance dynamic range (in particular as characterised by a different maximum luminance a.k.a. peak brightness) than an input image, the present application teaches several variants of a luminance processor (501) arranged to calculate an output luminance of a pixel of an output image (Im_LDR; Im3000nit) having a second luminance dynamic range characterized by a second peak brightness (PB_LDR; PB_MDR) from an input luminance of a spatially collocated pixel of an input image (MAST_HDR) having a first luminance dynamic range characterized by a first peak brightness (PB_HDR), characterized in that the luminance processor comprises:

a gain calculation unit (514) arranged to calculate a multiplication factor (gL) being a function of the input luminance and a luminance mapping function (FLM);

a maximum calculation unit (601) arranged to calculate a strength value (V) which is the maximal one of the three red, green and blue color components of the color of the pixel of the input image, wherein those components are either linear red, green and blue color components or a power of those linear red, green and blue color components;

(Continued)

an overflow calculator (602) arranged to calculate an overflow measure (T) indicating how close to the upper gamut boundary the output luminance is;

a gain factor modification unit (603) arranged to determine an alternative gain factor (F1(gL)) in case the overflow measure is larger than a threshold (G), and arranged to keep the original gain factor otherwise, and arranged to output one of those as a final gain factor (gF); and a multiplier (530) to multiply the input color (R'G'B'_nrm) by the final gain factor (gF) to obtain an output color (R'G'B'_HDR) having the output luminance.

24 Claims, 13 Drawing Sheets

(51) Int. Cl.
| | | |
|---|---|---|
| *G06T 7/90* | (2017.01) | |
| *G06T 9/00* | (2006.01) | |
| *H04N 9/64* | (2023.01) | |
| *H04N 9/68* | (2023.01) | |
| *H04N 9/77* | (2006.01) | |
| *H04N 23/88* | (2023.01) | |

(52) U.S. Cl.
CPC ................ *H04N 9/68* (2013.01); *H04N 9/77* (2013.01); *H04N 23/88* (2023.01); *G06T 2207/10016* (2013.01); *G06T 2207/10024* (2013.01); *G06T 2207/20092* (2013.01)

(58) Field of Classification Search
CPC .......... H04N 9/69; H04N 23/82; H04N 23/83; H04N 9/77; H04N 19/00–395; H04N 19/85–895; H04N 1/64–648; G09G 2320/0271; G09G 2320/0276; G09G 2320/0626–0653; G09G 2320/0673

See application file for complete search history.

(56) References Cited

U.S. PATENT DOCUMENTS

| | | |
|---|---|---|
| 10,313,687 B2 | 6/2019 | Stessen |
| 10,609,395 B2 | 3/2020 | Kerofsky |
| 2007/0080975 A1* | 4/2007 | Yamashita ............... H04N 9/68 348/E9.04 |
| 2012/0306947 A1* | 12/2012 | Kim ..................... G09G 3/3233 345/694 |
| 2013/0215360 A1 | 8/2013 | Pollack |
| 2013/0342587 A1 | 12/2013 | Nakagawa et al. |
| 2017/0272690 A1* | 9/2017 | Seifi ........................ G06T 5/92 |
| 2017/0330529 A1* | 11/2017 | Van Mourik .......... H04N 19/46 |
| 2018/0061310 A1* | 3/2018 | Sako ................... G09G 3/3406 |
| 2018/0276801 A1 | 9/2018 | Stessen |
| 2019/0164262 A1* | 5/2019 | Cellier ...................... G06T 5/92 |

* cited by examiner

HIGH DYNAMIC RANGE VIDEO COLOR REMAPPING

CROSS-REFERENCE TO PRIOR APPLICATIONS

This application is a continuation of U.S. patent application Ser. No. 16/770,133 filed Jun. 5, 2020 which is the U.S. National Phase application under 35 U.S.C. § 371 of International Application No. PCT/EP2018/083856, filed on Dec. 6, 2018, which claims the benefit of EP Patent Application No. EP 17206169.9, filed on Dec. 8, 2017. These applications are hereby incorporated by reference herein.

FIELD OF THE INVENTION

The invention relates to methods and apparatuses for coding high dynamic range images, and in particular the changing of image pixel luminances to convert the image to a different luminance dynamic range.

BACKGROUND OF THE INVENTION

About 5 years ago, the novel techniques of high dynamic range video coding were introduced.

This contrasts with the legacy video coding according to which all videos were encoded until then, which is nowadays called Standard Dynamic Range (SDR) video coding (a.k.a. low dynamic range video coding; LDR). SDR's luma code definition, of Rec. 709, was able to encode (with 8 or 10 bit lumas) only about 1000:1 luminance dynamic (a,k,a, Opto-electrical transfer function OETF) range because of its approximately square root function shape (luma: Y=sqrt (Luminance L)), which encoded for the typical rendering capabilities of all displays at that time luminances approximately between 0.1 and 100 nit, the latter being the so-called peak brightness (PB).

A first HDR codec was introduced to the market, the HDR10 which is e.g. used to create the new black ribbon HDR blu-rays, which merely changed the OETF to a more logarithmically shaped Perceptual Quantizer function standardized in SMPTE 2084, which allowed defining lumas for luminances between $\frac{1}{10,000}$ nit and 10,000 nit, sufficient for practical HDR video production. After the calculation of the lumas, one just had a 10 bit plane of pixels (or rather with the two chrominance planes Cb and Cr 3 bit planes), which could be classically treated further down the line "as if" they were an SDR image mathematically, e.g. MPEG compressed. Of course the receiving side should now it gets a HDR image rather than an SDR image, or incorrect rendering will occur. If one merely mapped linearly (coded image max. white a.k.a. coding peak brightness PB_C to SDR display peak brightness PB_D) an image with PB_C=1000 nit would look 10× too dark, which would mean that the night scenes become unwatchable. Because of the logarithmic nature of the PQ OETF, HDR10 images are watchable, but have an ugly deteriorated contrast, making them look inter alia washed out and of incorrect brightness.

A problem of such a mere HDR video image (a.k.a. HDR grading, with the word grading indicating which luminance the various scene objects should have in an image representation with a PB_C of e.g. 1000 nit (or higher), to make the HDR scene look optimal in that representation) is that it will only display correctly on a display of identical PB_D=1000 nit, and under similar surround lighting conditions, ergo, it was soon discovered that such blu-ray disks don't always display perfectly, and also in this situation the night scenes may be unwatchable.

Thereto the more advanced HDR video coders encode two different gradings of a HDR scene: an image of higher dynamic range, e.g. of PB_C=5000 nit, and one of lower dynamic range, which is typically an SDR image having PB_C=100 nit, because that is then immediately displayable on legacy LDR displays.

Real world scenes (although an uniformly lit scene has due to the 100:1 ratio of object reflectancies only such a lesser dynamic range) can have considerably high dynamic range. E.g. a cave with a small opening to the sunlit outside, may on a 10,000 nit PB_C reference representation which contains a suitable HDR grading of that scene for home television viewing contain luminances far below 1 nit for the cave pixels, and up to 10,000 nit for the outdoors pixels. Such a challenging HDR image is not so trivially converted to considerably lower dynamic range (e.g. at least 100× when going to SDR), especially if the content creator desires to convey a still reasonably similar HDR look also in the SDR rendering, but as elucidated with FIG. 1, in principle it can be done.

What should be well-understood here is that if we are talking about the encoding of the HDR images and the corresponding lower dynamic range images, there may be constraints. Instead of actually communicating two separately graded images (a HDR and 100 nit PB_C SDR graded image of the original scene), one typically (as will be further elucidated with FIG. 2) communicates only one graded image of the pair of extreme-endpoint differently graded different PB_C images, and as metadata functions to map the colors and in particular their luminance of the pixels of the received image into the colors of the other graded image.

It should be understood that there are two classes of image coders: the first one (Mode 1) communicates HDR images to receivers, as did HDR10 so one can e.g. re-use the PQ OETF for encoding those images, but adding metadata prescribing how to luminance downgrade this HDR image to lower dynamic range (e.g. calculate the SDR 100 nit PB_C image from the received HDR image). The second class (Mode 2) communicates the SDR image of the pair, and the inverse-shaped functions to upgrade to the HDR image, which is useful for serving a large installed base of legacy televisions (this involves further technical constraints for any add-on technology to follow).

There are technical mechanisms to re-grade to intermediate PB images, called medium dynamic range (MDR) images, so instead of converting the received SDR image to the original e.g. 5000 nit PB_C image which was created by the content creator at the creation or transmission side, the receiver (e.g. a settopbox, TV, computer, cinema equipment or the like), the receiver can calculate e.g. a 700 nit PB_C image. This so-called display adaptation is important because not everybody will have a display of exactly 5000 nit PB_D, i.e. naturally matched with the content (a so-called reference display, to distinguish it from any actual display at the receiving side), ergo an image suitable (meaning most optimally conveying the artistic intent made in the 5000 nit HDR grading, and the creation-side's luminance or in general color re-grading functions) for the e.g. 700 nit display must be calculated. If not, the behavior of the rendering is undefined, and typically the brighter parts of the content will not be shown or at least badly be shown (this can lead to e.g. a low contrast person in a bright mist totally disappearing, meaning that some people get to see a totally different movie story, which is very undesirable).

We will non-limitative assume that the HDR and SDR image gradings are created by a human color grader (e.g. first the HDR grading, and therefrom an SDR grading), however in some application an automatic system determines the graded images and the color mapping functions (which is e.g. currently preferred in real-time broadcast, in which the re-use of existing systems is not compatible with human grading).

For the convenience of the reader and to get him up to speed quickly on some of the aspects involved, FIG. 1 shows a couple of archetypical illustrative examples of the many possible HDR scenes a HDR system of the future (e.g. connected to a 1000 nit PB_D display) may need to be able to correctly handle, i.e. by rendering the appropriate luminances for all objects/pixels in the image. E.g. ImSCN1 is a sunny outdoors image from a western movie (which has mostly bright areas, which should ideally be rendered somewhat brighter than on a 100 nit display, to offer more a sunny look than a rainy day look, e.g. with an average luminance of say 500 nit), whereas ImSCN2 is a nighttime image.

What makes such an image sunny, versus the other one dark? Not necessarily the relative luminances, at least not in the SDR paradigm. What makes HDR image rendering different from how it always was in the SDR era which ended only a couple of years ago, is that the SDR had such a limited dynamic range (about PB=100 nit, and black level approximately 0.1 to 1 nit), that mostly only the intrinsic reflectivities of the objects could be shown in SDR (which would fall between 90% for good white and 1% for good black). That would be good for recognizing objects (having a certain amount of brightness from their reflection, and of course their chromaticity), under uniform technically controlled illumination, but not so much the beautiful variations in illumination itself one can have in natural scenes, and what impact that can have on viewers. If the display allows it, and therefor so should the image coding and handling technology, one would in a forest walk really see the sun shine through the trees, i.e. rather than just a somewhat more yellow impression like on a SDR display, one would like to see bright and colorful sunlit clothes when the person walks from the shadow into the sun. And so should fire and explosions have an optimal visual impact, at least as far as the PB_D allows.

In SDR one could make the nighttime image somewhat darker, in the luma histogram, but not too much or it would just render as too dark and ugly an image. And also on a 100 nit TV or in a 100 nit encoding there just isn't any room available for anything overly bright. So one had to show the objects independent of their illumination, and couldn't at the same time faithfully show all the sometimes highly contrasty illuminations of the scene that could happen. In practice that meant that the highly bright sunny scene had to be rendered with approximately the same display luminances (0-100 nit) as a dull rainy day scene. And even the night time scenes could not be rendered too dark, or the viewer would not be able to well-discriminate the darkest parts of the image, so again those night time brightnesses would be rendered spanning the range between 0 and 100 nit. A conventional solution to that was to color the night scenes blue, so that the viewer would understand he was not looking at a daytime scene. Now of course in real life human vision would also adapt to the available amount of light, but not that much (most people in real life do recognize that it's getting dark, or that they are in a darker, or quite bright environment). So one would like to render the images with all the spectacular local and also temporal lighting effects that one can artistically design in it, to get much more realistic rendered images at least if one has a HDR display available. What exactly would be an appropriate luminance for say a light saber in a dark room we will leave to the color grader creating the master grading(s) to decide, and this application will focus on the needed technical possibilities to create and handle such images.

On the left axis of FIG. 1 are object luminances as one would like to see them in a 5000 nit PB master HDR grading, for a 5000 nit PB_D display (i.e. the grader makes an image assuming the typical high quality HDR TV at home will have 5000 nit PB_D, and he may actually be sitting in a representation of such a home viewing room and grade on such a grading display). If one wants to convey not just an illusion, but a real sense of the cowboy being in a bright sunlit environment, one must specify and render those pixel luminances sufficiently bright (though also not annoyingly too bright, which is a typical pitfall of HDR image creation and handling), around e.g. 500 nit. For the night scene one wants mostly dark luminances, but the main character on the motorcycle should be well-recognizable i.e. not too dark (e.g. around 5 nit), and at the same time there can be pixels of quite high luminance, e.g. of the street lights, e.g. around 3000 nit on a 5000 nit display, or around the peak brightness on any HDR display (e.g. 1000 nit). The third example ImSCN3 shows what is now also possible on HDR displays: one can simultaneously render both very bright and very dark pixels. It shows a dark cave, with a small opening through which one can see the sunny outside. For this scene one may want to make the sunlit objects like the tree somewhat less bright than in a scene which wants to render the impression of a bright sunny landscape, e.g. around 400 nit, which should be more coordinated with the essentially dark character of the inside of the cave. A color grader may want to optimally coordinate the luminances of all objects (already in the PB_HDR=5000 nit master HDR image), so that nothing looks inappropriately dark or bright and the contrast are good, e.g. the person standing in the dark in this cave may be coded in the master HDR graded image around 0.05 nit (assuming HDR renderings will not only be able to render bright highlights, but also dark regions).

So one sees that there can be various typical behaviors for the re-grading: e.g. sometimes one desires to keep luminances substantially equal on all luminances ranges, and sometimes they are scaled (e.g. linearly scaled with the diminishing PB_C). Or some objects like the sun one may always want to map to PB_C.

One must understand that in a coding framework there are some limitations. E.g., in a mode 1 system, one cannot just liberally do whatever one likes, but rather typically the mapping must happen according to a limited set of standardized luminance mapping functions (because the decoder needs to understand what is done at the creation side, and decoders needs to fulfill practical market requirements, like not being to complex and costly). So one must engineer a set of functions which behave correctly, and sufficiently according to what the users of the system and the content creators in particular desire, which is what applicant invented in previous years. For a mode 2 system, one must also warrant that the functions are invertible, and in particular that not too much information is lost in the SDR image, which could then never be mathematically recovered by re-grading in a receiver trying to obtain a close reconstruction of the original creation-side HDR image.

The functions for optimally re-grading will typically be content-dependent, so they will typically communicated at least per shot of images of a same, similarly looking and of similar luminance distribution scene.

Just to illustrate some technical video coding possibilities for elucidation of some components which are important to understand well, we describe an exemplary HDR video coding system which applicant has designed for HDR image and in particular HDR video coding (whereby the reader should understand the invention's principles are applicable to other systems than the exemplary system for explanation also).

This video coding system not only can handle the communication (encoding) of merely a single standardized HDR video (e.g. 10 bit perceptual quantizer used as luma code defining EOTF for the encoding), for a typical single kind of display in the field (e.g. images defined with PB_C=1000 nit, under the assumption that every end viewer having a 1000 nit PB_D display), but it can at the same time communicate and handle the videos which have an optimal look/grading for various possible other display types with various other peak brightnesses in the field, in particular the SDR image for a 100 nit PB_D SDR display.

I.e., although in such a HDR video communication system one actually communicates only one type of graded images as transmitted pixelated images, typically though not exclusively in this example SDR images (or alternatively the HDR images), because one also adds in metadata one or more functions defining the HDR image pixel colors and in particular luminances from those SDR images, one has at the same time communicated HDR image looks for the scene also (without actually needing to communicate HDR images, like in dual image communication, or at least a second layer of pixelated HDR image data).

Thereto, a set of appropriate reversible color transformation functions F_ct is defined, as is illustrated with FIG. 2. FIG. 2 shows non-limitedly a typical system of the SDR-communicating type (i.e. mode 2), for the purpose of explaining the basic concepts. These functions may be defined by a human color grader, to get a reasonably looking SDR image (Im_LDR) corresponding to the HDR master image MAST_HDR, whilst at the same time ensuring that by using the inverse functions IF_ct the original master HDR (MAST_HDR) image can be reconstructed with sufficient accuracy as a reconstructed HDR image (Im_RHDR). The IF_ct functions can be determined from the forward, HDR-to-SDR mapping F_ct functions as communicated, or, the system may even directly communicate the IF_ct function(s).

The color transformer 202 typically applies the F_ct luminance mapping of the relative luminances of the master HDR image (MAST_HDR) pixels, which we will assume to be normalized so that the maximum luminance is 1.0. For understanding the present invention's concepts in a simple manner, one may for simplicity assume it uses a $4^{th}$ power luminance mapping function (L_out_SDR=power (L_in_HDR; ¼)) for deriving the normalized SDR output luminances of the pixels of the 100 nit PB_C SDR output image Im_LDR (i.e. the right side of FIG. 1), i.e. that such a function gives a reasonable look for the SDR graded corresponding images to the master HDR image of the scene (reasonable meaning for the particular scene such aspects like that a large percentage of the shadowy areas will not look to dark, lamps and other luminous objects will pop as desired by virtue of them having still a reasonable inter-region contrast with the darker image regions even in the SDR image, at least as far as the SDR luminance dynamic range allows, etc.; for other images other factors may contribute, but such details are not essential nor limiting for elucidating the technical components of the present invention).

Since the receivers must be able to reconstruct the master HDR image from the received corresponding SDR image, or at least a close reconstruction but for some compression-related artefacts, apart from the actual pixelated images also the color mapping functions must enter the video encoder 203. Without limitation, we may assume that the video is compressed with a MPEG HEVC video compressor, and the functions are stored in metadata, e.g. by means of the SEI mechanism or a similar technique.

So after the action of the content creating apparatus 221, from the image communication technology perspective, the video encoder 203 pretends it gets a normal SDR image as input, and more importantly: outputs what is technically a SDR image (coded image Im_COD), following the Rec. 709 standard SDR luma specification. So then the further technology, e.g. a transmission formatter 204 applying all the necessary transformations to format the data to go over some transmission medium 205 (e.g. coding to store on a BD disk, or frequency coding for cable transmission, etc.) can just apply all the typical steps it used to perform in the SDR coding paradigm.

Subsequently the image data travel over some transmission medium 205, e.g. a satellite or cable or internet transmission, e.g. according to ATSC 3.0, or DVB, or whatever video signal communication principle, to one or more receiving side(s).

At any consumer or professional side, a receiver unformatter 206, which may be incorporated in various physical apparatuses like e.g. a settopbox, television or computer, undoes the channel encoding by applying unformatting and channel decoding. Then a video decoder 207 applies e.g. HEVC decoding, to yield a decoded SDR image Im_RLDR, and the color transformation function metadata F_ct. Then a color transformer 208 is arranged to transform the SDR image to an image of any non-SDR dynamic range (i.e. of PB_C higher than 100 nit, and typically at least 6× higher). E.g. the 5000 nit original master image Im_RHDR may be reconstructed by applying the inverse color transformations IF_ct of the color transformations F_ct used at the encoding side to make the Im_LDR from the MAST_HDR. Or, a display adaptation unit 209 may be comprised which transforms the SDR image Im_RLDR to a different dynamic range, e.g. Im3000 nit being optimally graded in case display 210 is a 3000 nit PB display, or a 1500 nit or 1000 nit PB image, etc. We have non-limitedly assumed the video decoder and color transformer to be in a single video redetermination apparatus 220. The skilled reader can understand that one can similarly design a topology which communicates e.g. HDR images with PB_C=10,000 nit, and the color transformer makes output HDR images with e.g. PB_C=2500 nit, for a corresponding TV or monitor.

FIG. 3 elucidates in a theoretical color space what a HDR-to-SDR color mapping (comprising in particular a luminance mapping) would look like.

The color space is of the cylindrical category, and has as its base a chromaticity plane. The two dimensional chromaticity represents the "own nature" of a color, e.g. whether one has some saturated orange, or rather an unsaturated red (i.e. a pink), irrespective of the illumination or brightness of that color. As the brightness measure, we use the luminance, which is the third, vertical dimension of the space (actually the relative luminance is used, which is supposed to stop at 1.0 as maximum). As chromaticity (Chrom) coordinates we use the saturation (Sat) being the distance from the achromatic luminance axis in the center, and the hue angle (H), but one could also use the CIE (u,v) coordinates, or r=R/(R+G+B) and g=G/(R+G+B) in which R, G, and B are the linear amounts of contribution of red, green respectively blue to the color (amount of red etc. photons one could simplistically say), etc.

An SDR color (Col_out) is calculated from a HDR color (Col_in). The reader should understand that we represent both pixel colors in a normalized color space (PB_C=1.0), so typically the SDR color should be brighter to still be visible (one can understand this by contemplating the technology wherein the relative luminance L corresponds to an LCD transmission percentage of a backlight which is much brighter for a HDR display than an SDR display, hence to have the same final color seen at the front of the display, the HDR display must transmit less light and vice versa). It should be quickly noted that showing both the HDR and SDR image luminances in the same normalized gamut can be somewhat misleading regarding some aspects, because the brightest HDR colors are colors that just are impossible in SDR, so the artist or automaton has to select a reasonable approximation for it, but this simple explanation suffices for this patent application, which is about the technical calculations happening in the HDR image or video handling chain, such as the way to create a lower dynamic range image from a received master HDR image.

The color transformation behaves quite nicely as desired (in particular orthogonal, meaning that a luminance change doesn't influence the chromaticity or vice versa), as one can see that the relative brightening indeed involves no change of the chromaticity (Chrom) of the color.

This is not so trivial ab initio. The most typical legacy transform brightens images by applying a function on the three additive color channels separately (e.g. a power(L;⅓) function will nicely brighten the darkest colors whilst mapping 1.0 to 1.0 as output yielding no overflow), which will introduce hue errors, ergo: instead of just brightening the pixel colors, they also change their hue all over the color gamut of possible colors, because of the non-linearly changed relationship between the relative amounts of R, G, and B color component in the additive mix.

Even in the theoretical color space there is still another possibility of changing the chromaticity, and in particular its saturation.

In nature, the space of all colors will be a cylinder, because one could actually illuminated the selected unsaturated yellow color with the light of a supernova.

However, displays have limitations, and also any actual coding of colors (which is why we introduced the normalized color gamut: even though PB_C=1.0 may correspond to an actual, absolute PB_C in nit which is quite high, like 10,000 nit, there is still such a limit): by natural construction it is so that the brightest color is white, and any chromatic color such as bright yellow must have a lesser luminance.

So even in this theoretical color space, it can happen e.g. near the blues which are typically relatively dark (e.g. 10% of the luminance of white), that the simple brightening mapping maps above the gamut of realizable colors (GAMU), which in practice means that some color component (in this example the blue), must clip to its maximum value, yielding a color on the upper gamut boundary which is typically too desaturated and often of incorrect hue (e.g. a light blue).

However, applicant did manage to construct a simple system which behaved according to all desiderata: in particular no out-of-gamut issues, leading to the correct chromaticity for all colors, at the cost of perhaps a somewhat lowered luminance than would be ideally desired. The principles of this HDR coding technology (i.e. the determination, communication, and use of the F_ct luminance mapping metadata functions thereof) which are described in WO2014056679 are shortly re-iterated as being the following (for later understanding of differences with the present teachings).

As its FIG. 5 shows, the brightening (or darkening) luminance transformation is actually applied by multiplying the three color components equally with a determined gain factor g (remember that luminance is a linear additive combination of the linear color components R, G, and B, i.e. $L=a*R+b*G+c*B$; the coefficients a, b and c depending on the chromaticities of the RGB primaries used in the video definition, e.g. for Rec. 709 they are approximately a=0.3; b=0.6; c=0.1), which guarantees that their relative proportionality doesn't change, i.e. keeping the hue and saturation of the color the same before and after the luminance processing.

The teaching further prescribes that the gain factor is determined for each possible color based on which one of the three RGB components is the largest, which guarantees that the mapping scales correctly with the local Lmax (chrom), i.e. never giving out of gamut problems. Ergo such an embodification of the color mathematics realizes the ideal linear and separated color/brightness processing behaviour, whilst also minding the limitations of the gamut, the gamut of a display in particular.

However, for various reasons, one wants color processing which can also work in other color representations, i.e. other color spaces.

Since analog video (PAL, NTSC) times already, the YCbCr (or corresponding YIQ) color space was defined, which proved quite useful for video communication, but people also wanted to do color processing in it (e.g. with analog tv circuits changing the brightness by regulating on the Y channel, or the saturation by varying on the Cb and Cr channels similarly).

FIG. 4 shows how it looks and what its properties are. To begin with, the RGB (in 0-1.0) cube is rotated on its tip, so that now the diagonal axis where R=G=B becomes the achromatic i.e. colorless brightness axis.

The new brightness measure however is now the luma.

It is defined with the same a, b, c coefficients as luminance, however, now from the non-linear (gamma-precorrected) RGB coefficients, which according to Rec. 709 are approximately $R=sqrt(R\_linear)$, etc. (note that in the HDR era further non-linear RGB components have been defined, by R_nonlin=OETF_HDRcodec(R_lin), etc.).

One would tend to think that Power(Luma;2) equals luminance, and this is indeed so on the achromatic axis (since there R=G=B so $power((a+b+c=1)*sqrt(R);2)=power(Y;2)=L$). However, for chromatic colors the luma is not simply related one-dimensionally to the luminance, but also to the chromaticity (or chrominance), which is called the non-constant luminance leak.

This has some consequences: if one wants to brighten the image colors by applying a function, e.g. Y_out=power (Y_in; ⅓), then the input luma Y_in depends on the chromaticity, and hence so does the strength of the brightening due to the Y-dependent action of the (selected as simple to understand) $⅓^{rd}$ power function. Note that any such luma mapping function (whether the simple exemplary power function, or a much more complex and interesting function with several carefully selected local higher or lower slopes corresponding to luminances of objects of particular interest in the scene) in our above-described prior art system corresponds to a luma-dependent gain g(Y) by which the (linear or non-linear in respective possible embodiments) RGB components are multiplied (because one can implement the component multiplication also in power function redefinitions of linear RGB, like e.g. YCbCr). So if the "wrong" luminance is estimated for a color (having the same luminance theoretically as some achromatic grey which needs to be brightened) as a differing luma, such a color may get the "wrong" boost, leading i.a. to a fluorescent look of saturated colors, like a red color.

A third major difference with the theoretical color space of FIG. 3 is that the color components CbCr are not chromaticities, which can be seen by the fact that (apart from the gamut limitation at the top in the upper half) this color space is conical rather than cylindrical.

The saturation is not changing with increasing Cb, but rather with the angle from the achromatic luma axis. This can be understood by taking a blue primary color (ColBlu), i.e. of maximum saturation reproducible in this display-dependent color system, and increasing its luminance towards the brightest possible blue (Blu). This being the same kind of saturated blue color, its chromaticity and hence its saturation will not change, but its Cb value increases with luma (or correspondingly with luminance). This luminance-dependency is why one calls the Cb and Cr component a Chrom-inance, the first part indicating the fact that it codifies a color aspect (the blueness of a color), but the second part indicating that this varies linearly with the non-linear luma. One can change the saturation in such an YCbCr representation by multiplying the chrominances equally with a constant saturation multiplier (Sm) though:

Cb_out=Sm*Cb_in; Cr_out=Sm*Cr_in. The luma then does not change because it is not affected by this processing, although the luminance of the color will change because of the non-constant-luminance property of the luma (which in many situations is not perceived problematic by the users of the color processing systems, but in some more critical scenarios it may be). Changing only the luma part however, does not result in a constant color chromaticity behaviour however, because the CbCr components then correspond to the "wrong" luminance, hence a color of different saturation. But this can be relatively easily corrected by counter-steering the CbCr coefficients by the similar difference in luma (or luminance in a luminance-based processing, e.g. a linear YCbCr space, or the linear versions incorporated in non-linear topologies as described below, etc.).

The saturation issues at the top of the gamut, because of its narrowing towards maximum white still exist in any system (and can lead to hue errors), and that is what the current application's new embodiments and teachings will deal with.

A last thing which is interesting as background information for full understanding of the various below teachings is elucidated with FIG. 5.

FIG. 5 re-summarizes applicant's co-developed Technicolor-Philips (a.k.a. SLHDR1 respectively SLHDR2) basic HDR decoder hardware (the encoder being the mirror processing). It can be similarly driven in two flavors: mode 1 in which case PQ-based YCbCr is inputted, i.e. which is calculated based on the non-linear R'G'B' coordinates being calculated from the linear ones with an OETF which is the SMPTE 2084 Perceptual quantizer function, and the mode 2 version which we elucidate here, in which case normal (i.e. Rec. 709 decodable, or approximated as sqrt-OETF-based) SDR YCbCr image colors are input.

Note that similarly to this example, our embodiments can be implemented both in a linear (i.e. linear RGB-based) YCbCr color space calculation, and the power-law based non-linear one, like the R'=sqrt(R)-based example we describe here.

This is because calculations in the linear space can be made equivalent to power-based calculations, in particular sqrt-power-based calculations, e.g.:

$$k * \text{power}(a * \text{sqrt}(R) + b * \text{sqrt}(G); 2) =$$
$$\text{power}(a * \text{sqrt}(k*R) + b * \text{sqrt}(k*G); 2)$$

So this means that even though we apply the common gain factor gNL to the non-linear normalized RGB components R'G'B'_nrm, to obtain the correctly darkened HDR pixel colors, we can actually do a linear, fully separate luminance-based processing (i.e. avoiding the fluorescent color brightness errors due to the non-constant luminance luma-based brightness processing).

This can be seen by the fact that the luminance processing part of the total SDR-to-HDR color mapping (the upwards move of the example color in FIG. 3) by luminance processor 501 gets as input the luminance L of the currently processed pixel.

A color space convertor 502 can handle this, by it being arranged to convert non-constant luminance luma Y to luminance, which can be done in various manners (e.g. the non-linear R'G'B'-values are converted to their linear ones by applying the appropriate inverse OETF, the so-called EOTF, and then the luminance L is calculated by the appropriate linear definition equation based on RGB-triplet values, as explained above).

The needed linear multiplicative factor for the three color components, gL, is obtained by dividing the normalized output luminance L_out, by the normalized input luminance L.

But quite interestingly, although one does linear processing on the luminance, one can specify (and do) processing actually in a non-linear version of the luminance (because of the split-off luminance-only information channel, this can be formulated equivalently).

In this example we show the processing in a perceptually uniformized domain, which may be more natural for a human grader (or automaton) to specify his dynamic range re-grading desiderata in. Thereto a domain convertor 511 converts the linear luminances into perceptually more uniform perceptual lumas PY (e.g. by applying the PQ OETF, or the function patented by Philips in WO2015007505, the teachings of which are incorporated herein as potential embodiment teachings of the present application). Luminance mapper 512 performs the mapping of the SDR perceptual lumas PY to HDR output perceptual lumas PY_O. One may assume continuing the above simplified elucidation that the correct perceptual lumas of the HDR image are obtained by applying a simple third power law: PY_O=power(PY;3), but in general the content creator can define any complicated most optimal curve shape, which is read from the co-communicated metadata SEI(F_ct), and e.g. loaded into a LUT, or similar. One can see (the inverse of what was explained with FIG. 3 on how to create corresponding object pixel luminances (actually here calculated as their corresponding lumas) for an image of lesser dynamic range and in particular coding peak brightness PB_C than the input image) that one needs to dim most of the relative luminances to obtain the correct corresponding look image of higher dynamic range (e.g. of PB_C=1000 nit).

Thereafter, second domain converter 513 re-linearizes the perceptual lumas, i.e. obtains the correct HDR luminances L_out.

So this topology is a powerful manner to realize chromaticity-preserving pure luminance changes in various manners as desired (at least that is: as long as the common multiplicative factor does not boost any of the R'G'B' values above their maximum, which without limitation we will assume to be 1.0, which is the above-gamut clipping explained above). The rest of the circuit is an embodiment which is not so critical for understanding the below aspects of our present invention.

Another Color LUT B(Y) can be loaded from metadata (by chromatic processing derivator 520), giving a B factor for each pixel luma Y to multiply the CbCr values as received by (by multiplier 521), to obtain more appropriate output values CbCr_COR. This can be a simple strategy, or a more complex one which also takes the V-value of the color into account, where V=max(R'G'B'), or V=max(R,G,B) in the linear scenario. Finally a matrix derives normalized R'G'B'-values R'G'B'_nrm. These are in the normalized gamma as shown in FIGS. 3 and 4, but square root-distributed because they are still in the non-linear domain of the input image colors (Y_SDR, Cb,Cr). In fact, these are the colors located at their SDR positions (see FIG. 3: Col_out (SDR), because in this example the SDR colors are the input colors instead of the output colors). They will need to be appropriately mapped by for each pixel the corresponding gNL-factor, so that multiplier 530 can multiply the three components similarly by that factor, to obtain the non-linear, normalized HDR colors R'G'B'_HDR.

So multiplier 530 performs: R'_HDR=gNL*R'_nrm; G'_HDR=gNL*G'_nrm; B'_HDR=gNL*B'_nrm [Eqs. 1].

The same luminance change can also alternatively be implemented on other power-function-based derivative color representations, e.g. Y'_HDR=gNL*Y'_nrm; Cb_HDR=gNL*Cb_nrm; Cr_HDR=gNL*Cr_nrm, whereby the Cb and Cr are defined according to their usual equation based on R'G'B', i.e. in the example such would be SDR chrominances, but normalized to 1. Note that in this text the prime sign would indicate we have a power ½ based quantity (i.e. the classical Rec. 709 definition of the non-linear luma), and the absence of the prime typically indicates normal linear color components, and a double prime indicates yet another possible HDR definition of the color components, with R" typically indicating R"=OETF_PQ(R). The skilled reader can understand in which defined system the corresponding Cb and Cr are defined.

Finally, a display conditioner 540 can condition the colors for a generic reference (in case of storage e.g.) or specific connected display. In the former example, the processing may be so simple to convert the gamma 1/ (2.0)-defined R'G'B' values to PQ OETF-defined lumas R"G"B"_PQ. In the latter example, any particular display adaptation algorithm may be applied by display conditioner 540 to obtain instead of the e.g. 5000 nit PB_C-defined R'G'B'_HDR, e.g. 800 nit PB_D optimized R"G"B" values (it should not be misunderstood that in other embodiments this display adaptation may already happen in the processing itself, in particular in the luminance processor 501). In fact, the display conditioner can yield any signal format desired by the connected display, and may communicate to receive information about that from the display prior to forming the desired output colors and the signal codifying them (e.g. over HDMI cable, or wireless etc.).

The reader can see that this topology has some advantages of several hitherto mutually exclusive color processing visions: it has a YCbCr-structure, in particular that it accepts normal YCbCr input colors, yet it also shows all the nice properties of linear color processing, such as no hue shifts of the normal colors (i.e. in HDR images, most of the colors lie well below the gamut top, since those colors typically codify ultrabright colors like lamp colors, which oftentimes are colorless white, or at least not annoying if they are desaturating). However, the problem of above-gamut color mapping still exists, as that exists with any conical-top color space (whether conical-base or cylindrical-base). It doesn't seem to occur in color-cube processing like separate channel non-linear RGB mapping, at least in such a representation it is easy to avoid overflow, but as said in such representations color errors can come back due to changed proportionalities of the color components.

How any luminance mapping function (e.g. the function shape desired and created by a human grader) or algorithm can be converted into a single multiplicative gain factor by gain calculation unit 514 is as follows: suppose the input luminance is e.g. 0.2 and the application of all the functions in the unit 501 (which in general can, between the two endpoint boxes doing a domain conversion, comprise any number of processings leading to a final result) yields an output luminance of 0.4. Then gain calculation unit 514 can be a simple divider yielding the (linear domain) gL factor as L_out/L.

The input luminance L will correspond to the input color components, e.g. the linear R,G,B. Multiplying those with the gL factor which in the example equals 2.0, will yield the correct output color components, which also have the correct desired output luminance. In case the calculations (i.e. the IC topology, or software) do not happen in the linear domain, a gain factor domain converter 515 may be needed, which in this example in which the processing happens in the classical gamma 2.0 SDR domain should apply a square root function to obtain the final, needed non-linear gain factor gNL=sqrt(gL). Where it was formulated that the luminance mapping happens with luminance as input, a corresponding formulation with luma as input can similarly be embodied, for which one would typically use the classical gamma 2.0 luma. (note that the V-dependency of the color processing of unit 520 is not priorly taught, but is useful in combination with the present invention). The color mathematics applied by color matrixer 523 to derived the normalized R'G'B'_nrm coordinates from CbCr_COR should not be too difficult to understand for the skilled person in color technology, and is also not really important because our present teachings work on various color calculation embodiments, i.e. whether that part is present of not, as long as one can derive three color components which can be luminance-adjusted by the common g-factor that part of the color processing is sufficiently present, i.e. although we show a full HDR decoder color processing topology, for the present teachings it is the upper part of 501 which is interesting.

WO2017/157977 also teaches aspects of the present applicant's preferable approach to HDR video luminance re-grading, and in particular some specifics on how to treat ultradeep black colors. But in common with the present discussion, it teaches how one can advantageously define luminance mapping functions, which can then be applied as a common multiplication of a corresponding g-factor by the three color components of a pixel (linear or non-linear), e.g. typically YCbCr. What this patent application doesn't teach is an elegant solution for any consequential above gamut behavior, should that be found objectionable in practice (note that HDR images may often contain relatively dark colors, which may not create problems in SDR when not excessively boosted, and often some achromatic highlights, which would not pose psychovisual problems if clipped). What the expert might typically do then is to select a slightly less "aggressive" (i.e. less luminance boosting from HDR to SDR) curve, e.g. choose a more suitable slope for the brightest image luminances of the luminance mapping function applied by the dynamic range adjuster (DRA) of WO'977 FIG. 12. Any problem that is of sufficient concern will then typically be mitigated sufficiently, although coming with some other psychovisual image effect typically (e.g. a change of said upper linear segment slope will typically also have an impact on the shape of the function below, because of the continuity desideratum).

So it was envisaged by the inventor to offer a new technical solution of dynamic range changing color processing, whilst keeping some of the good properties of some existing color space calculations, and in particular which can be matched with several of the practical dynamic range changing hardware or software topologies as described below (and above), and similar topologies.

SUMMARY OF THE INVENTION

As said, the color mapping problem near the color gamut top (of a display typically though not exclusively) is a nasty problem, which may easily introduce e.g. hue errors (e.g. a color becoming more greenish), which is why the present application teaches a new method of such color processing suitable for the newly emerged field of high dynamic range image handling and the corresponding derivation of images of different dynamic range (which may be assumed for simplicity to be determined primarily by the peak brightness PB_C), which in particular comprises a luminance processor (501) arranged to calculate an output luminance of a pixel of an output image (Im_LDR; Im3000nit) having a second luminance dynamic range characterized by a second peak brightness (PB_LDR; PB_MDR) from an input luminance (L) of a spatially collocated pixel of an input image (MAST_HDR) having a first luminance dynamic range characterized by a first peak brightness (PB_HDR), characterized in that the luminance processor comprises:

a gain calculation unit (514) arranged to calculate a multiplication factor (gL) which multiplication factor is defined for the input luminance of any input color of an image pixel of the input image based on a luminance mapping function (FLM) indicating how to adjust the input luminance to become a corresponding intermediate output luminance, by calculating the multiplication factor as the division of an output of the luminance mapping function for the input luminance divided by that input luminance: gL=FLM(L)/L;

an overflow calculator (602) arranged to calculate an overflow measure (T) indicating how far above an upper gamut boundary at the chromaticity of the input color the intermediate output luminance is, which intermediate output luminance results from applying the multiplication factor (gL) to the input color;

a gain factor modification unit (603) arranged to determine a lower alternative gain factor (F1(gL)) in case the overflow measure is larger than a threshold (G), and arranged to keep the original gain factor otherwise, and arranged to output one of those as a final gain factor (gF); and a multiplier (530) to multiply the input color (R'G'B'_nrm) by the final gain factor (gF) to obtain an output color (R'G'B'_HDR) having the output luminance.

The output image may typically be of a lesser dynamic range (i.e. a lower PB_C value), though not exclusively because there are scenarios were the top of the gamut problem (hence its solution) exists also in dynamic range upgrading, and in any case one can apply the processing (e.g. same IC) to both situations, because as a protective strategy it will not kick in if not needed (the unproblematic colors are just processed as specified by the content-creation side derived color mapping functions F_ct, or in general the color mapping functions as derived in any manner, e.g. by the receiver itself based on image analysis.

The gain calculation unit determines a multiplicative gain factor (e.g. gL or a factor related to it), because the mechanism typically works by similarly luminance-scaling the three color components (which naturally are the linear red, green and blue color components for additive color reproducing systems like a television; or power functions thereof, like Y'CbCr which can be calculated based on square roots of the linear RGB components, which is a quite good approximation of the legacy Rec. 709 video OETF).

The potential dangerousness of the situation (because on the one hand colors are more likely to map above the color gamut boundary because of the e.g. HDR-to-SDR image calculation if they are already bright, but also if they are colors of a particular type, like the blues which always have low luminances, so any luminance-mapping which is based on the input luminance the pixel color has is risky for such blues) can according to the inventor's insight be nicely judged by starting with calculating V=max(R,G,B) of the input color (or max(R', G', B') which is somewhat different in numerical value, but behaves similarly according to the principles of this approach), and then define an overflow measure based upon this. Although various overflow measures can be defined to apply the same technical principles of the invention (correct where and to the extent needed), some of which need not use V (like e.g. via a table containing upper gamut luminances for each chromaticity and calculating a distance equation), especially applying the gL to the V value by multiplying the two is an elegant manner to embody the overflow measure. This should not be misunderstood by the reader as mechanisms which always apply the luminance mapping based on this strength value V, i.e. V_out=F_Lt(V_in), like what is taught in WO2014056679. Calculating a multiplicative gain factor for e.g. the RGB components according to an re-grading specification which works on V rather than luminance L of the pixel colors being consecutively processed always automatically maps inside the gamut, so does not have the problem which the present solution caters for, but that comes at a disadvantage of yielding darker SDR images, darker than preferred potentially. Of course in the present system's embodiments one can also make a more conservative darker luminance-based mapping function F_ct (/ inverse of FLM), but the embodiments also have the potential to make a brighter function, and solve the upper gamut area luminance mapping issues in other manners. The most basic variants may also want to clip some of the brightest colors to a color on the upper gamut boundary, but typically guaranteed with a chromaticity (or at least hue) which is the same as that of the input color. This creates merely a differential brightening, which applies only to some of the colors of the image, and for some images (and especially when going to a dynamic range which is not much different, typically lower, than the dynamic range of the input image), there may be only few pixels which are so clipped. In fact what is in the dashed rectangle on the bottom-right of FIG. 6 can be seen as some protection mechanism. Whether it actually is a protection mechanism, in the sense that it produces corrected g-factors from initial g-factors depend on the embodiment type. In a first class of embodiments, the automaton or human grader at the content creation side relaxedly determines some HDR-to-SDR luminance mapping function (which behaves appropriately for most of the image colors, e.g. it gives a nicely correctly bright appearance of the darker colors of the current scene images, and also for the desaturated colors near the achromatic axis), and relies that the mechanism will sufficiently solve the problems for the (few) problematic colors, e.g. some bright reddish and orangeish sunset sky colors. This has the advantage that such mechanism can "quick-and-dirty" determine this function, rather than needing to specify in considerable detail what exactly should happen color-mapping-wise for those few critical sunset sky colors, and that may e.g. by useful for real-time content encoding. Such mechanism still falls apart into two further sub-categories, namely one in which the encoder determines reasonable values for the content itself (or even has prefixed values, which are well-working in general on most critical color scenarios, in the sense that this reduces the clipping error severity corresponding to doing nothing), and a second sub-category where the content creation side itself determines an optimal strategy. So simple embodiments can use a very simple variant, having e.g. a fixed G threshold value, say 0.75, and as an alternative lower gain allocation linearly distribute the luminances between G (below 1 typically) and e.g. 1.5 (e.g. the maximum intermediate output color for that chromaticity, or even over all chromaticities), to [G,1]), or the same with a variable, creator-optimizable G threshold. And e.g. with FIG. 11 we elucidate how as a second correction pass to his initially specified re-grading function(s), which is roughly good, i.e. for most of the image pixels and the image look, the e.g. human grader can specify a couple of more parameters defining the mapping in the upper areas of the color gamut (the desideratum typically being to leave the re-grading in the lower parts of the output gamut alone, i.e. as it was specified by the content creator in the FLM function). The G threshold in fact serves as an optimizable or at least reasonable determination of a point in the upper region of the output gamut where the corrective action to the original re-grading should best take place.

But it should be seen that as an alternative to the "corrective" embodiments, in which the parameters like rho etc. determine a recalculation of the initially determined g-factor (i.e. e.g. gL based on function FLM and the present color's luminance), at least that is for the problematic colors which would (significantly) map above the gamut top boundary, the encoder can also convert all of that into a set of final color processing functions (or even the g-factors corresponding therewith) to apply at the receiving side. This can be done in particular if the content-creation side co-communicates a function to map the colors in the upper gamut areas (typically "differentially" based on the normal uncorrected behavior). In that case the gain factor modification unit does the test on whether to apply the "standard" rough luminance mapping, or the more advanced one, exactly as specified by the content creator in his function FADAP (and the reader understands that the receiving side, e.g. a TV, can even do some slight variations of its own on this specification, but for simplicity of teaching we will assume it just follows the re-grading wisdom of the creation side as communicated in the various upper gamut area luminance or in general color mapping parameters).

The overflow calculator (602) calculates an overflow measure T, which indicates how critical the situation is, i.e. how close to the gamut boundary hence overflow a mapped color (i.e. after applying the luminance mapping as its g-factor) is, or especially interesting: how far above the gamut top the mapped color is, ergo, how seriously a correction is needed (because as said, the correction may consist merely of darkening, but that may not be the best choice for all different types of HDR image, especially if much darkening is needed, and as will be shown below the embodiments can also decide to do the correction in a different more advanced manner, e.g. by determining an optimal amount of color desaturation in addition to some, lesser amount of darkening). In particular, overflow measures below actual overflow (e.g. 90%) are useful in embodiments which need to make room for overflowed colors by also re-grading some adjacent colors which by themselves are not really overflowing, and that is particularly interesting in scenarios which need invertible color processing, like mode 2 encoding, which encodes the HDR images actually as corresponding re-graded SDR images (ergo, both the images must contain sufficient detail to be mappable to HDR images of sufficient quality, by functions which by themselves must be good too).

It is advantageous if the luminance processor (501) comprises a data reception means (689) arranged to receive the threshold (G) from the creator of the content over a network (690). Other embodiments of the luminance processor could by themselves determine a threshold, e.g. in a HDR image receiver, e.g. by analysis of the properties of that image (e.g. by looking what type of HDR effect there is, like how many pixels, the kind of structure in it e.g. with a texture characterizer, etc.). Simpler versions may even work with a fixed, or at least standard initial value, like e.g. G=0.9. However, it can be quite advantageous if the creation side of the content can dictate an optimal value of G, for an entire movie, a shot of N successive images of the same scene, or even per single time moment image. Then not only a more complex image analysis can be employed at the creation side, but also a human grader can specify his own best working G value, e.g. with the UI as shown in FIG. 11. Based on a single G-value, one can design strategies of g-factor redetermination, e.g. with linear function segments as exemplified by FIG. 10.

It is advantageous if the luminance processor (501) comprises a data reception means (689) arranged to receive a function (FADAP) to determine the alternative gain factor from the creator of the content over a network (690). In such a manner one could create at the content creation side quite complex g-factor re-determination functions, which take into account the specific needs of the content, which can be useful if there is quite specific very critical content in the upper gamut areas (e.g. a pattern of soft contrast written on a blue commercial TL tube, and then the re-determination function could be so shaped that it tries to keep a higher luminance contrast slope at least around the luminances of those text characters). The human grader (or even an automaton) can e.g. identify critical regions in the brightest parts of the image which need sufficient contrast after the corrective mapping to the final output colors, and tune the shape of the FADAP function, which equates with tuning how the final g-factors will distribute the above-gamut intended but unrealizable colors will distribute over the upper gamut region. When a part of a cloud starts looking too bland, the shape of such FADAP function can be corrected (or some of the correction can be shifted to saturation processing).

We teach here the framework aspects allowing the determination, communication and final application of such FADAP function, since the skilled person from or teachings can imagine there can be many detail aspects about how to design the specific FADAP function shape for each specific (set of consecutive) image(s), or class of images etc. (e.g. in some cases the content creator may put important emphasis on the luminance contrast of some sub-set of brightest luminances, reflecting this in the shape of the FADAP function determining the allocation of the input colors over the top region of the output gamut, with some specific scene object or image region colors taking more of the available gamut volume at the cost of some other colors' accuracy). With a simple elucidating example of a sunlit yellow evening sky, the reader can imagine that if one needs to reduce some of the local contrast (which defines the shapes of the clouds from their constituting grey values), perhaps below the visible or at least giving a reduced visual impression, that changing a first set of grey values (assuming for simplicity by mapping them to a single value) can have a different impact on the cloud shapes as seen than afflicting another subset of luminances (e.g. because the first luminances occur around the brightly lit borders of some important clouds, and the second luminances determine the internal look of some secondary clouds). Whether the embodiment of the FADAP describes at least a higher part of a normal luminance function which similarly to FLM can be converted to g-factor by the division, or it is defined on g-factors (g_out=FADAP(g_in)), is a detail which doesn't matter for the principles of allowing to set a good alternative within the properties of the present new framework.

Even if a function is communicated, for several embodiments (e.g. those which allow changing the prescribed re-determination mechanism at the receiver; or partial characterizations of the function) it may still be useful to also still communicate the G-factor.

It is advantageous if the luminance processor (501) comprises a data reception means (689) arranged to receive from the creator of the content over a network (690) a clipping parameter (Vmx) specifying above which hue-preserving color clipping is allowed, the clipping parameter being defined as a maximum of a red, green and blue color component. In this case one can allow some of the colors to ultimately become the same color in the output image, which may be a good optimum for non-reversible scenarios, i.e. which need not re-determine the original colors from what has become a single color. This can work with the other strategies (e.g. luminance dimming balanced with desaturation) below the sub-set of clipped colors. Ideally (and certainly for some applications), one would do not clipping at all, but sometimes it is a good component of the optimal image re-grading, since it can allow e.g. less darkening or desaturation for some other image colors, which may be especially useful if there are some critical regions, e.g. in the clouds, which need above-average attention ergo a large sub-volume of the upper output gamut region.

Depending on how one configures the parameters, a number of archetypical actions can happen on the image, and the severity of this depends on the kind of HDR scene, so one wants to optimally select between the options.

In the simplest case, one could set G equal to the gamut top value (G=1.0), which would simply mean a hard clipping for all those colors that happen to map above the gamut top, yet, in a hue and saturation preserving manner. Of course this can mean that several colors which are different initially in the input image (say typically the HDR image) are mapped to the same color in the output image of lower dynamic range (typically). That can be quite acceptable if the only object which violates the in-gamut condition is e.g. a colourful TL tube, because the differences in luminance are probably not that semantically meaningful for following the movie or video story anyway (in particular if this is just some décor lamp in the background, and the action is happening somewhere else). Knowing that one can never make a perfect saturated red and very bright TL tube in SDR anyway (which is why HDR images have a merit), it is for such a scene probably far more optimal to just represent the entire TL tube in SDR as maximum brightness primary red, rather than e.g. to significantly desaturate to still retain some luminance differences inside the light tube region (which would make the tube an ugly pinkish color). For a nice red sunset with lots of structure of the red-greyish clouds the optimal decision may be quite different. In such a case one does not want to hard clip too much, destroying potentially too much of the beautiful cloud structure. This could either be handled by more uniformly darkening all cloud pixel colors, but that can lead to a low G-value, or by introducing (also) a little bit of desaturation. But the Vmx parameter allows one to specify that there can still be a little bit of clipping also, even when "protecting" most of the cloud structure in the lower dynamic range image. In case one uses a reversible image handling method, like a mode 2 coding-based communication system in which the HDR images need to be reconstructed from received SDR images at any receiving side, the Vmx value should typically be so that only a couple of pixels are clipped loosing differentiation possibility (e.g. the inside of a lamp can be given all the same value 1023 in the SDR image, and this would still allow a HDR reconstruction which, although mathematically not exactly identical with the master HDR image at the creation side, visually gives a close enough approximation).

It is quite useful if the luminance processor (501) as claimed in one of the above claims comprising a partial mapping calculator (903) arranged to determine a first fraction of correction for multiplication by the (gL), and arranged to determine a second fraction of correction for determining a saturation multiplier (S) for driving a color saturation calculation. From our novel approach as taught, the skilled person can understand that a distance must be covered from the above-gamut original re-graded color as ideally intended, towards the gamut boundary. Looking at FIG. 8, the skilled person can learn and understand that one can define a fraction of such distance (e.g. half of it), and that one could design an alternative g-factor which maps to half such distance, i.e. not doing a full darkening needed to arrive downwards at the upper gamut boundary for exactly the input chromaticity ((hue, saturation), or (u,v)). There hence remains a distance (or more precisely overflow) Arem to be covered somehow, otherwise perhaps the chromaticity preserving clipping may kick in as default fallback, but that may not give the best visual result for the so affected objects in this image. The remaining distance towards so upper gamut boundary color can be covered in the orthogonal direction, i.e. by doing a corresponding desaturation processing.

The inventor discovered that the needed attenuation A (i.e. the corresponding multiplication factor for gL*V to bring it sufficiently down to be inside the gamut or on its boundary)

can be quite usefully composed of a first part Arho, and a remainder part Arem, which are defined with a parameter rho as follows:

$$\text{Arho=power}(A; \text{rho}); \quad \text{Arem=power}(A; 1-\text{rho}) \quad [\text{Eqs. 2}].$$

Such a specification can be determined based on some worst case color, and the other colors are then treated similarly.

This can considerably relax the complexity of the luminance downmapping, i.e. the function to re-determine the final g-factor gF to get a lot of critical HDR effect colors in the upper range of the lower dynamic range image, in particular for situations which need reversal of the functions like mode 2 HDR coding, because one can then handle the remaining problem, that the intermediate color is still above the gamut boundary with a desaturation operation rather than a further darkening, or more extreme contrast reduction when using another re-determination function FADAP shape. This allows again much more freedom to select for each special HDR effect, like brightly lit clouds near sunset, or a man being slightly visible in a bright mist (a shadow-man), or a sunlit exterior seen through a window, or lamps in a disco or fancy fair, etc., whether it is better to do somewhat more brightness reduction of the darkest of the problematic near gamut top colors, or more reduction of the contrast of the texture in those areas, or somewhat more saturation reduction. Optionally, instead of the simple global operation of this algorithm (which is relatively simple to realize by a human grader not needing to spent too much expensive grading time, or even an automaton), in quite tricky cases one can even send a number of processing parameter sets, and specifications of the region of color space on which to apply them (e.g. a different method for the red sunset, than for a blue TL tube area on the facade of a contrejour house in the foreground).

Again it can be quite advantageous if the luminance processor (501) comprises a data reception means (689) arranged to receive the fraction value (rho) of the above equations from the creator of the content over a network (690), rather than that a receiver has to determine an optimal rho value itself, because often the optimal value of a technical processing on images may be artistic in nature, i.e. it could even be a matter of taste whether for a first beautiful sunset its human creator accepts more clipping than for a second (some graders just want punchy colors for their look, and others want more soft, detailed patterns).

The technical mirror-claim of what a receiving side luminance processor can or should ultimately do to obtain the lower dynamic range image colors, in case the algorithm parameters are received from the creation side, is a system which much make those parameters, e.g. the G threshold, or the FADAP function, etc. Any or all of such parameters could be set by a human, or by an automaton (e.g. the automaton suggesting a good setting, to be improved by the human if needed, or the human just specifying any value without there being an image analyzing automaton being present, etc.). The automaton can identify such properties as coherence of regions (e.g. if there are many values like in a detailed texture like a flowerbed seen from a distance, or few), calculate some running contrasts in several directions in several regions (e.g. in the center of the image which may be visually more important), do some recognizability algorithm, such as that an ellipse is easily fittable on a smoothly evolving boundary with many grey values via a fuzzy fit, versus more difficult to obtain a good ellipse if said boundary is arbitrarily posterized yielding a jagged boundary, etc.).

E.g. a high dynamic range video encoder to encode typically the needed parameters in metadata to be sent or obtainable together with the images representing the HDR video may comprise:

an input for receiving an input image from an image source (1202);

an encoder for encoding the input image as an output image and for encoding at least one luminance mapping function (F_Lt); characterized in that the encoder comprises an image evaluation processor (1210) arranged to analyze the color properties of an image of the video, to determine a threshold (G) to be applied by a luminance processor as claimed in claim 1, and the encoder being arranged to output as metadata this threshold (G). A luminance processor of the above (and below) described types may be comprised e.g. to aid the human in seeing what his choices will look like at the decoder side, but may not necessarily be comprised in automatic encoders (although it often may, because the automatic image analysis may then be run on the one or more images resulting from one or more candidate selections of the parameters, e.g. an optimal G threshold, e.g. by comparing some image quality metric like contrasts, texture metrics, etc. in the input and tested candidate output image).

In general a high dynamic range video encoder (1201) may comprise:

an input for receiving an input image from an image source (1202); an encoder for encoding the input image as an output image and at least one luminance mapping function (F_Lt); characterized in that the encoder comprises an image evaluation processor (1210) arranged to analyse the color properties of an image of the video, to determine at least one of the parameters being: a) the threshold (G) according to the examples given for the use of an optimal threshold (where to leave the colors as is, and where to best start applying the mitigation algorithm with its corresponding color non-idealities), the function (FADAP), the clipping parameter (Vmx), and the fraction value (rho) indicating the split and the amount of correction to be handled by dimming versus desaturation, and the encoder being arranged to output as metadata such at least one of the parameters, so that any receiver's luminance processor can apply the corresponding re-grading.

Again depending on the embodiment, perhaps only one parameter is actually determined and communicated, like e.g. Vmx, in which case the receiving side can only determine a mapping which does reallocation of the colors in a range of luminances close to the gamut top for colors which correspond to a strength value V<=Vmx. But if three or more parameters are communicated, more complex balancing equations can be used at the receiving side. Keeping the number of parameters limited to a few of the most important ones, has of course advantages such as that the human grader with a few slides of a slider or a trackball can set those situation values that have most impact on the quality of the final result. The simpler systems will have an automaton to determine the at least one parameter though, because in some scenarios one does not have the man-power to do this, or at least does not want to bother the production crew with it. Such an automaton can do image analysis, e.g. detect whether the area of brightest colors (high L and especially high V check) has significant spatial luminance variation structure, e.g. by employing texture analyzers. Also several pragmatic embodiments can work with an image deterioration quality evaluation. This can be as simple as counting the amount, or spatial distribution of clipped pixels in some scenarios, or calculate measures like e.g. a running contrast measure on the luminance variations of the clouds before versus after the corrective re-determined g-factor processing.

It is of course especially interesting if this creation side has a high dynamic range video encoding system comprising a high dynamic range video encoder as described, which is connected to a user interface means (1203) which allows a human color grader (1204) to specify at least one of the parameters (G, rho, or the parameters specifying the more complex g-factor re-determination function to us etc.) as output of the image evaluation processor (1210), wherein the high dynamic range video encoder comprises a luminance processor (501) arranged to calculate an output image (Im_LDR; Im3000nit) which can be inspected on a connected display (1220). The skilled person understands that this can be embodied in various manners, e.g. in a semi-automatic determination it can be advantageous if the image evaluation processor already comes with a proposal for rho, G, etc., but that the human can fine-tune those, or in some operations he may even want to completely bypass the evaluation and set values on the output channels himself, etc. The luminance processor will in these cases be inside the encoder to allow the human to see what the action will actually do, at the receiving side, and correct to other parameters if those work better on the present scene. The display 1220 may be a reference display of high PB_D, e.g. 10,000 nit, so that it can show resultant SDR images, as well as many possible resultant MDR images, e.g. in case of PB MDR=3000 nit, it is able to show pixel luminances up to 3000 nit.

Further advantageous embodiments are inter alia:

A high dynamic range video decoder (1300) comprising:
an input to receive an input image and a luminance mapping function (FLM);
a second input arranged to receive a value of a threshold (G);
a luminance processor (501) according to any one of the claims 1 to 7, arranged to calculate an output image, by using the luminance mapping function (FLM) and the threshold (G) to change the luminances of pixels of the input image to produce an output image; and
an output for outputting the output image.

A high dynamic range video decoder (1300) comprising a luminance processor (501) according to any of the taught luminance processor embodiments;

A method of luminance processing to calculate an output luminance of a pixel of an output image (Im_LDR; Im3000nit) having a second luminance dynamic range characterized by a second peak brightness (PB_LDR; PB_MDR) from an input luminance of a spatially collocated pixel of an input image (MAST_HDR) having a first luminance dynamic range characterized by a first peak brightness (PB_HDR), comprising:
calculating a multiplication factor (gL) being a function of the input luminance and a luminance mapping function (FLM);
calculating a strength value (V) which is the maximal one of the three red, green and blue color components of the color of the pixel of the input image, wherein those components are either linear red, green and blue color components or a power of those linear red, green and blue color components;
calculating an overflow measure (T) indicating how close to the upper gamut boundary the output luminance is;
determining an alternative gain factor (F1(gL)) in case the overflow measure is larger than a threshold (G), and keeping the original gain factor otherwise, and outputting one of those as a final gain factor (gF); and
multiplying the input color (R'G'B'_nrm) by the final gain factor (gF) to obtain an output color (R'G'B'_HDR) having the output luminance.

A method of luminance processing to calculate an output luminance of a pixel of an output image (Im_LDR; Im3000nit) having a second luminance dynamic range characterized by a second peak brightness (PB_LDR; PB_MDR) from an input luminance of a spatially collocated pixel of an input image (MAST_HDR) having a first luminance dynamic range characterized by a first peak brightness (PB_HDR), comprising:
calculating a multiplication factor (gL) which multiplication factor is defined for the input luminance of any input color of an image pixel of the input image based on a luminance mapping function (FLM) indicating how to adjust the input luminance to become an intermediate output luminance, by calculating the multiplication factor as the division of an output of the luminance mapping function for the input luminance divided by that input luminance: gL=FLM(L)/L;
calculating an overflow measure (T) indicating how far above an upper gamut boundary at the chromaticity of the input color the intermediate output luminance is, which intermediate output luminance results from applying the multiplication factor (gL) to the input color;
determining a lower alternative gain factor (F1(gL)) in case the overflow measure is larger than a threshold (G), and keeping the original gain factor otherwise, and outputting one of those as a final gain factor (gF); and
multiplying the input color (R'G'B'_nrm) by the final gain factor (gF) to obtain an output color (R'G'B'_HDR) having the output luminance.

A method of luminance processing comprising receiving from the creator of the content over any connected network at least one of the taught parameters being: a) the threshold (G) above which the re-determination processing starts, and where the re-determined colors must squeeze into the output gamut, b) the parametric codification of the shape of the specific function (FADAP) desired for doing the g-factor determination (or any equivalent thereof, such as a function of the strength value V), c) the clipping parameter (Vmx) which allows still some amount of clipping for the most violating colors, i.e. those colors that fall the farthest above the gamut top hence are the most difficult to re-map in-gamut, and d) the fraction value (rho) which allows the specification of the splitting in two partial re-mapping strategies, one which recalculates pixel luminances, and one which recalculates pixel saturations, and applying such at least one parameter in the luminance calculation.

A HDR image signal comprising:
a set comprising image width multiplied by image height pixel colors;
at least one luminance mapping function defining how to calculate from a luminance of a pixel color an output luminance, and at least one of the parameters being: a) the threshold (G), b) the clipping parameter (Vmx) c) the fraction value (rho);

A HDR image signal comprising:
a set comprising image width multiplied by image height pixel colors;
at least one luminance mapping function defining how to calculate from a luminance of a pixel color an output luminance, and further comprising the function (FADAP).

It is clear that those signals embody the invention in such embodiments in which the value of e.g. G plays a major role in the specific luminance remapping which will occur. The meaning, format, unique identifiabilty of such metadata is a detail not so relevant for this elucidation, as the skilled person will readily understand that the correct working of the total chain (the signal merely making the connection between the creating and consuming apparatus or method) is typically realized by suitably standardizing the metadata, e.g. with placeholders agreed by a standardization body like e.g. ETSI, and the creating apparatus safeguarding that the receiving apparatus will understand the format by e.g. communicating in a header that the signal is being communicated as ETSI SL_HDRxyz format, etc.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concepts, and in which dashes are used to indicate that a component is optional, non-dashed components not necessarily being essential. Dashes can also be used for indicating that elements, which are explained to be essential, but hidden in the interior of an object, or for intangible things such as e.g. selections of objects/regions (and how they may be shown on a display).

In the drawings.

DETAILED DESCRIPTION OF THE EMBODIMENTS

Figure 1:
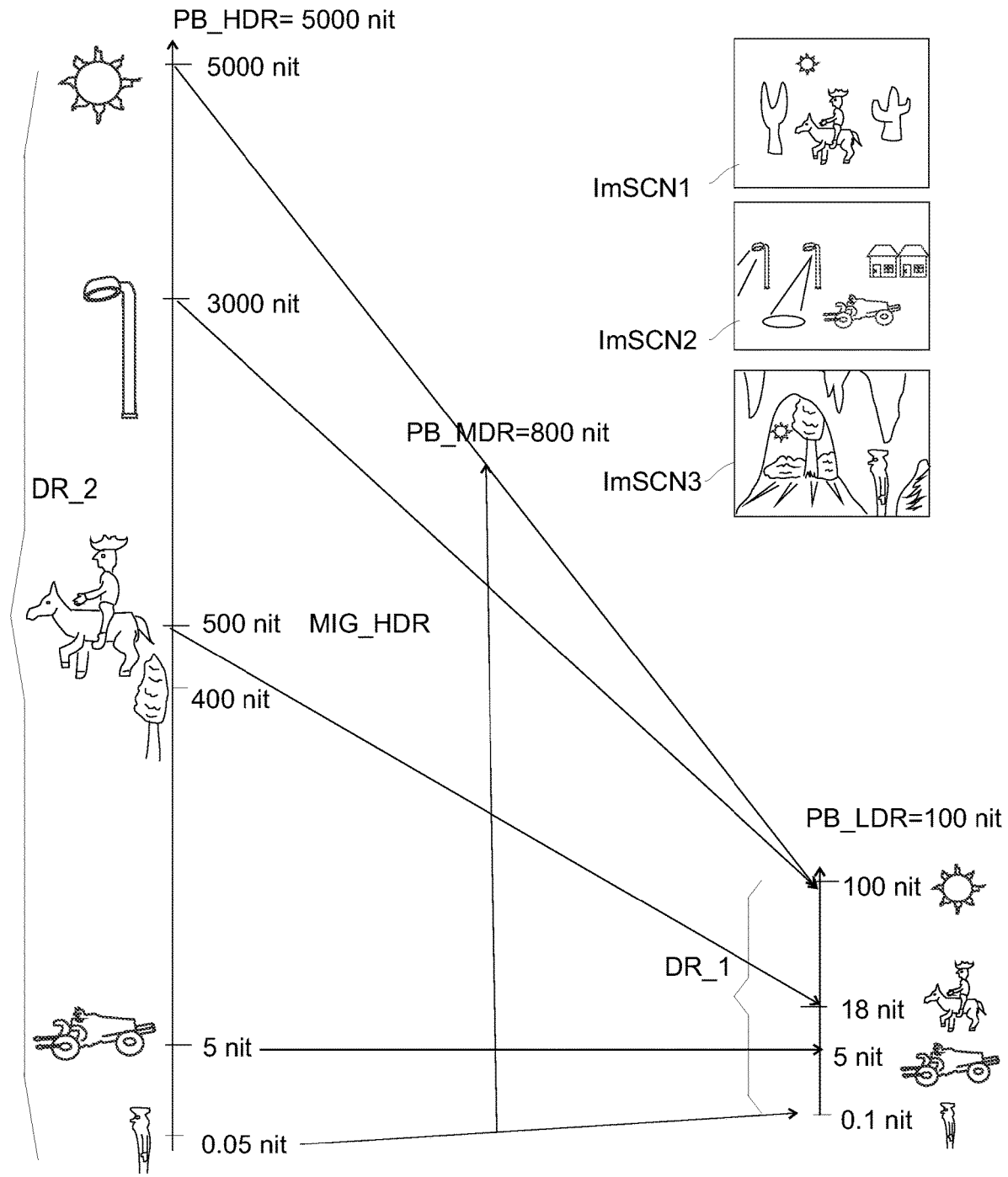
FIG. 1 schematically illustrates a number of typical color transformations which occur when one optimally maps a high dynamic range image to a corresponding optimally color graded and similarly looking (as similar as desired and feasible given the differences in the first and second dynamic ranges DR_1 resp. DR_2) lower dynamic range image, e.g. a standard dynamic range image of 100 nit peak brightness, which in case of reversibility (mode 2) would also correspond to a mapping of an SDR image as received which actually encodes the HDR scene, to a reconstructed HDR image of that scene.
Figure 2:
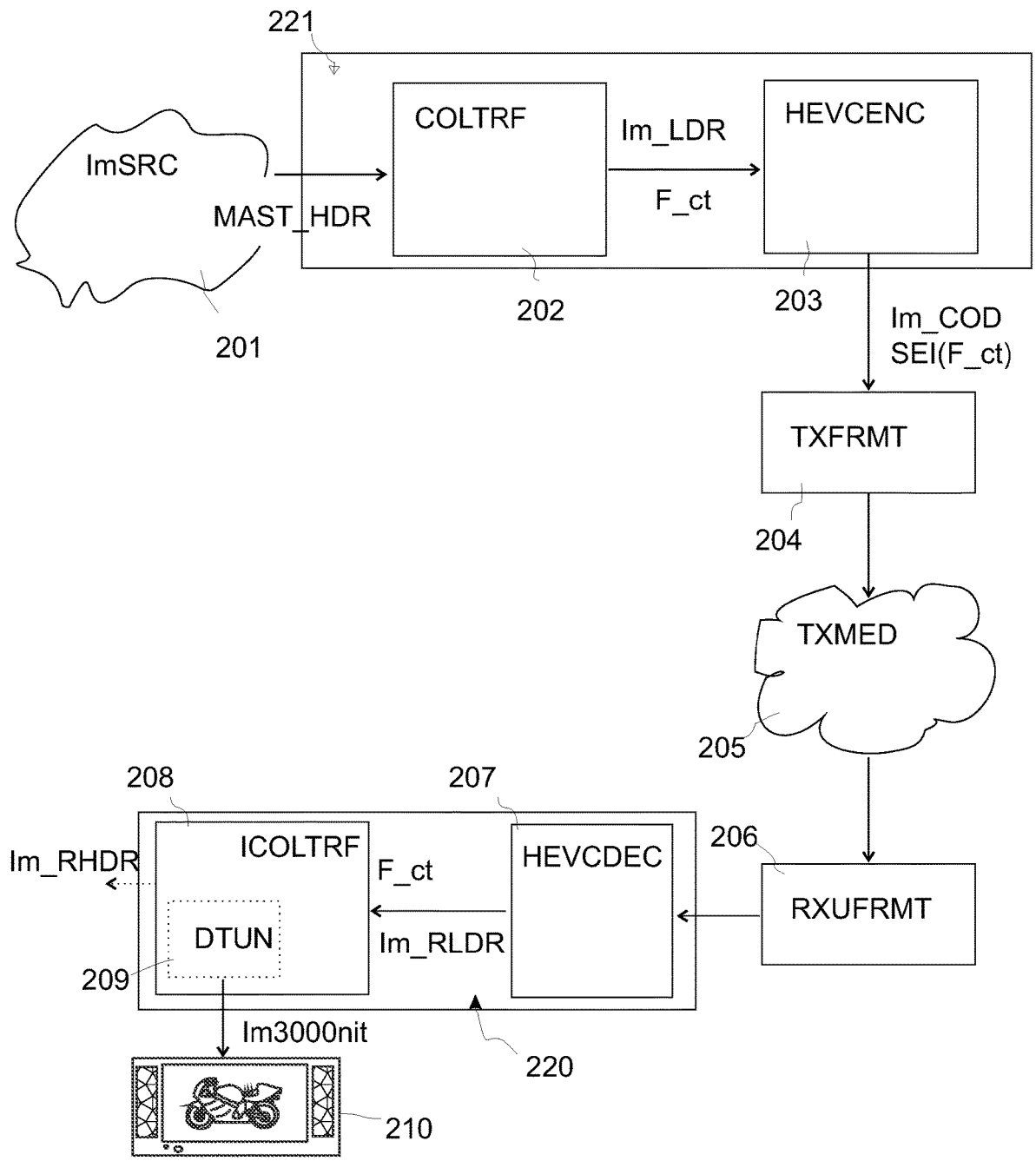
FIG. 2 schematically illustrates an satellite-view example of a technology to encode high dynamic range images, i.e. images capable of having luminances of at least 700 nit (i.e. at least 7x the PB_C of the SDR image) typically or more (typically 1000 nit or more), which applicant recently developed, which can actually communicates the HDR image(s) as an SDR image plus metadata encoding color transformation functions comprising at least an appropriate determined luminance transformation for the pixel colors, to be used by the decoder to convert the received SDR image(s) into HDR images(s) which are a faithful reconstruction of the original master HDR image(s) created at the image creation side.
Figure 3:
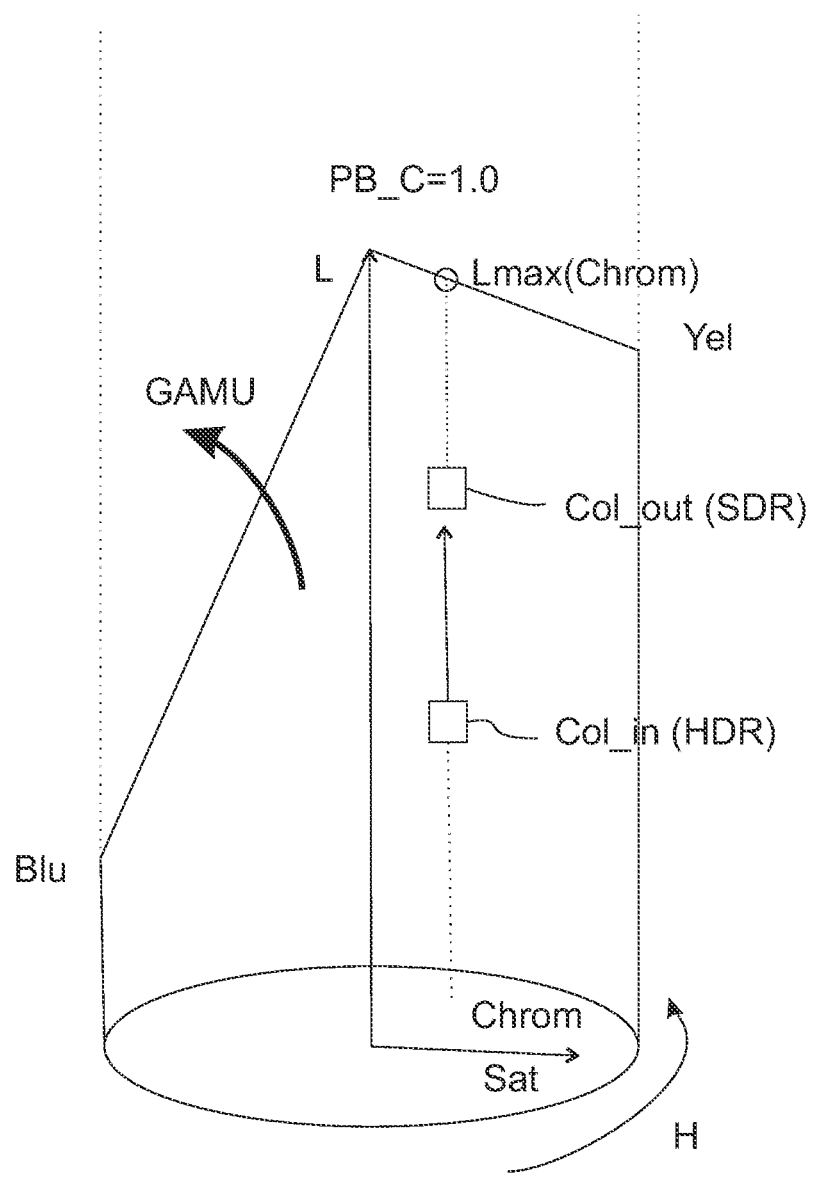
FIG. 3 shows how a mere luminance change (i.e. without unwanted chromaticity changes) of the dynamic range transformations occurring in such HDR decoding (or encoding) and handling typically occurs, e.g. when determining an image of lower dynamic range than the input image, as shown in a theoretical color space, with a chromaticity plane and orthogonal luminance L axis.
Figure 4:
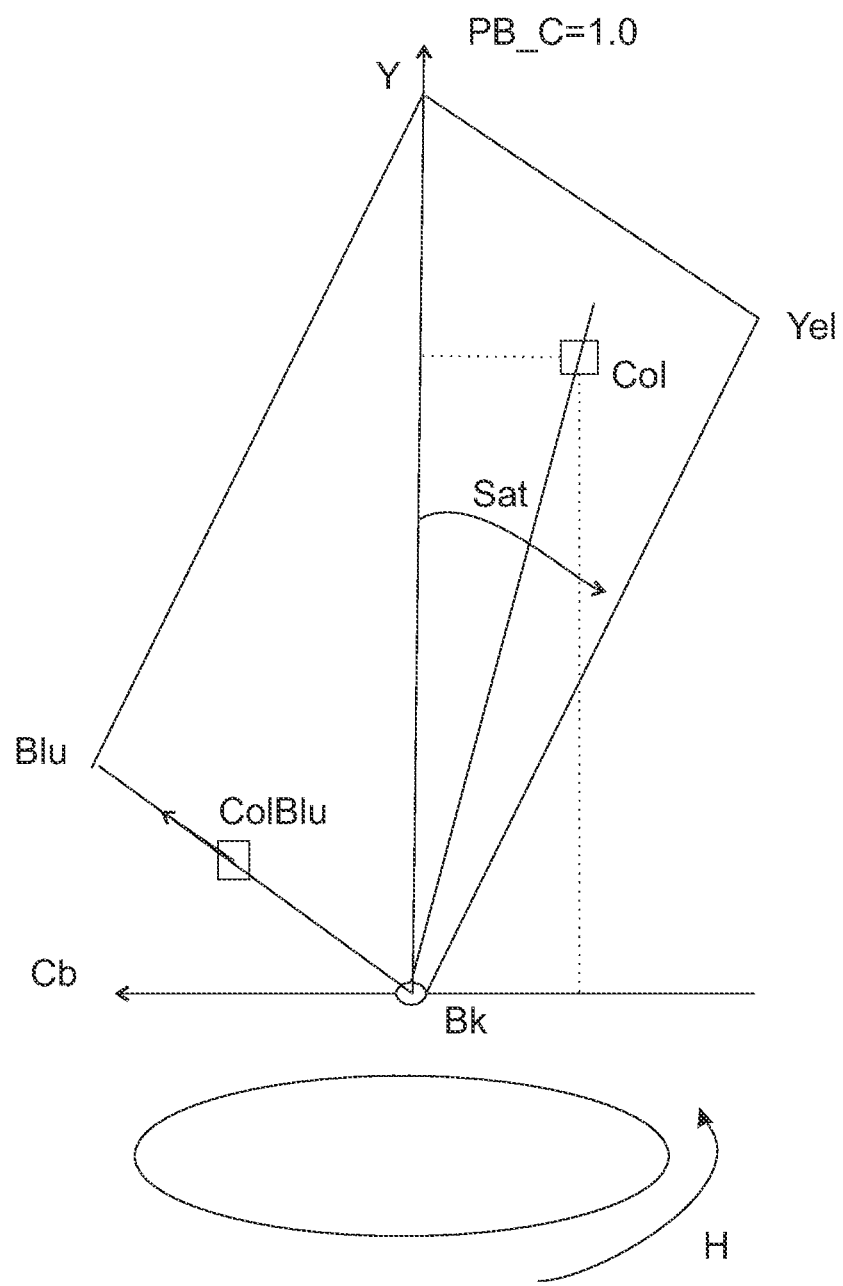
FIG. 4 schematically elucidates how colors and color processing behaves in another kind of color space (with another geometry), which space is the typical color encoding space of video: YCbCr (where the Y can in principle be the linear luminance L, or the non-linear gamma 2.0 luma Y', or even some other luma defined with another OETF, like PQ-based luma Y")
Figure 5:
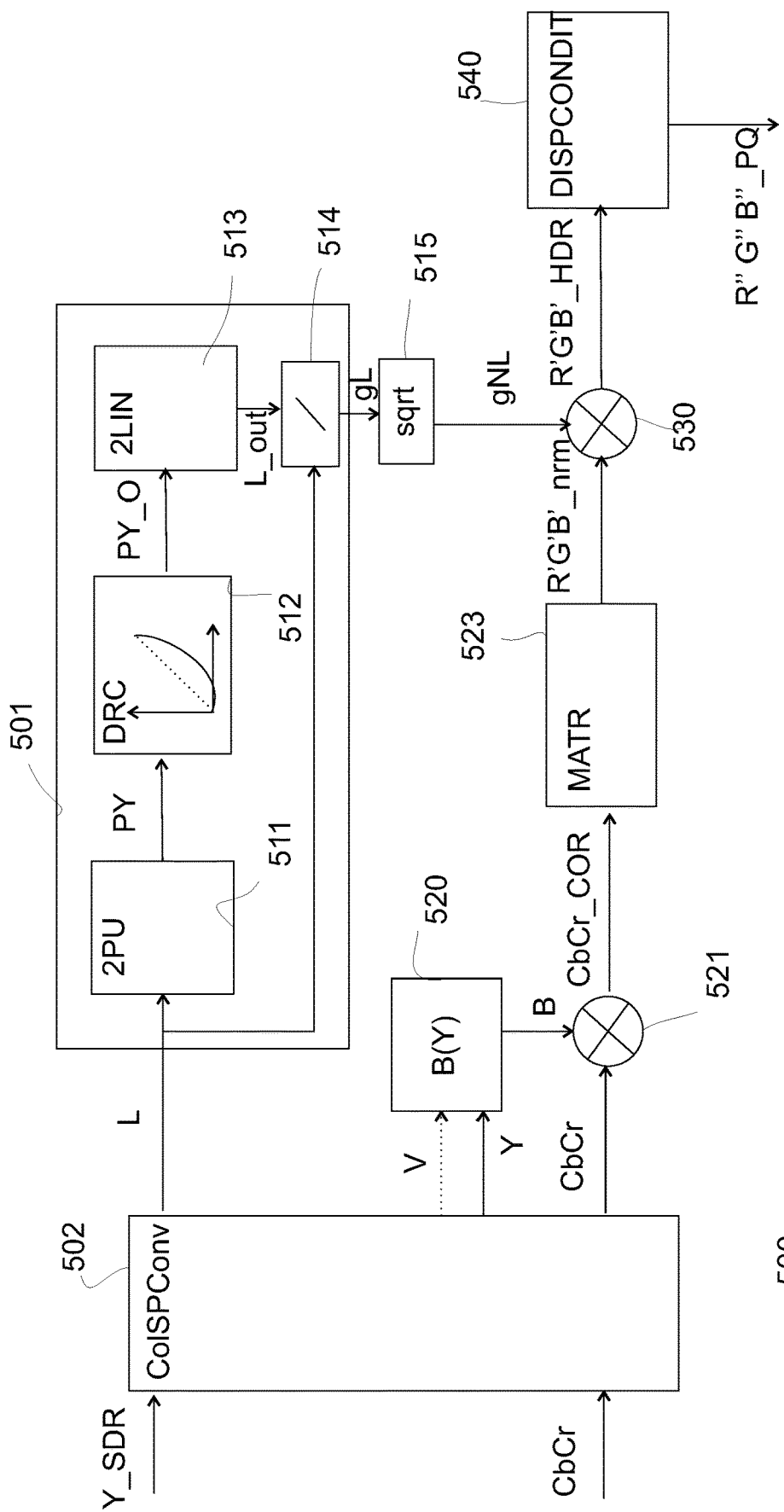
FIG. 5 (not intended to be limiting) shows a more detailed example of how applicant typically likes to perform the color transformation of unit 202 or 208 of FIG. 2.
Figure 6:
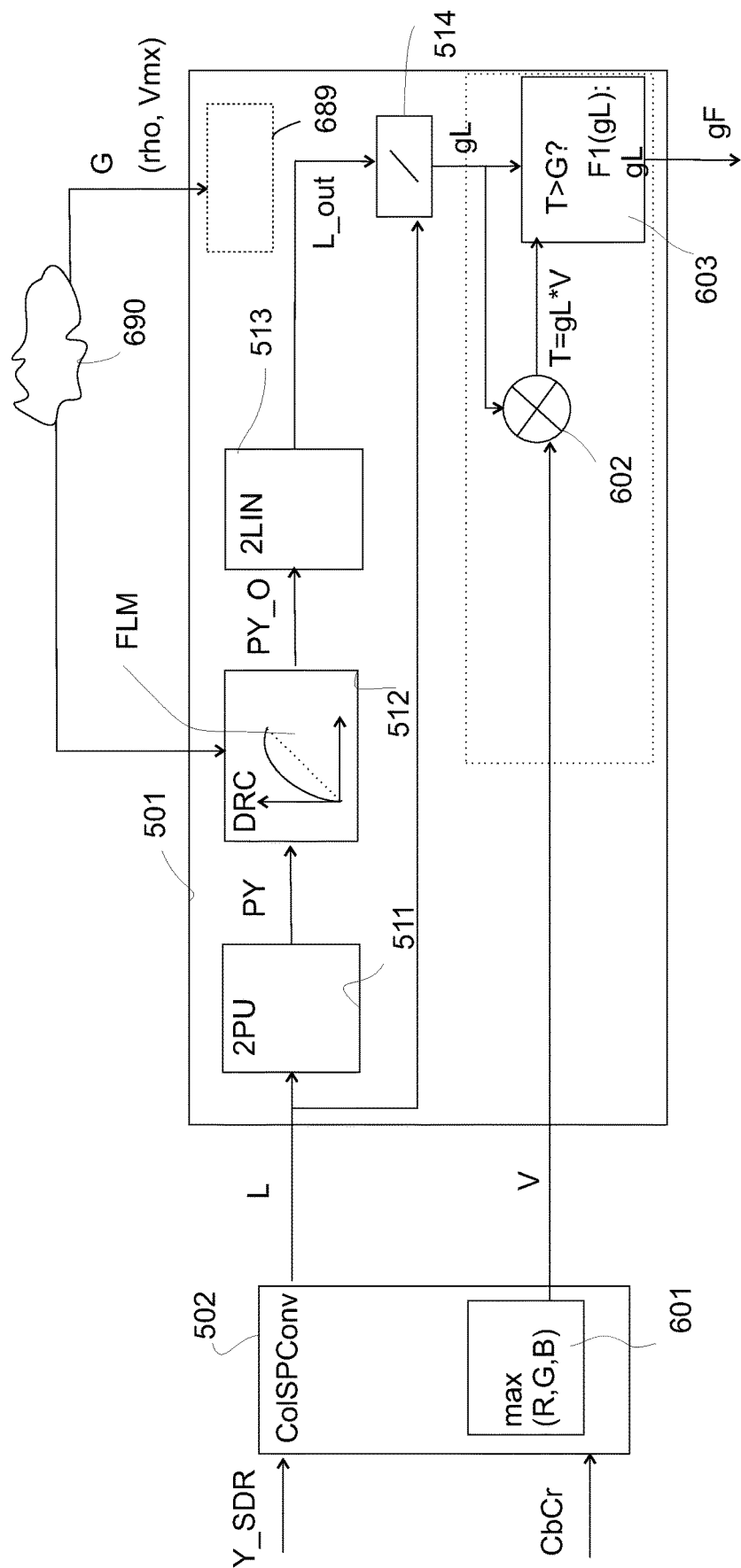
FIG. 6 shows a generic top-level elucidation of a primary aspect which the present invention adds to the luminance processing of systems like e.g. the one shown in FIGS. 2 and 5.

The elucidation of our various embodiments now focuses on the luminance processor (501) part of FIG. 5, which is re-drawn in a more elaborate configuration to elucidate the new principles of the present invention in FIG. 6.

Firstly, although we will elucidate assuming that the processing happens on the linear luminance, i.e. luminance L comes in and goes out (L_out), even though inside that branch the processing may convert to another luma domain like PQ, the same can also be done in other luma domains, e.g. typically with the classical Rec. 709 luma, i.e. sqrt(L) luma Y' (i.e. the luminance mapping of the dynamic range conversion by luminance mapper 512 may in such a scenario be directly specified as Y'_out=FLM*(Y'_in)).

However, in such a situation one must take care that instead of the non-constant-luminance luma one calculates a corresponding constant-luminance-luma (to make sure the luminance processing behaves correctly as a linear luminance processing even though it is implemented in the square root domain, and no errors due to luminance misestimation in the incorrect non-constant-luminance-luma occur like fluorescent red coats etc.).

Recall that the standard definition of luma is Y'=a*sqrt(R)+b*sqrt(G)+c*sqrt(B), whereas the definition of constant-luminance-luma is Y'_CL=sqrt(L), with L=a*R+b*G+c*B.

Typically the luminance processor of a video decoder gets YCbCr input, ergo, the natural derived color components from this are non-linear R'G'B'. One way to derive the constant-luminance-luma is to have the color space converter 502 first calculate the linear RGB components by applying the appropriate EOTF (i.e. R=EOTF_rec709(R')=power(R';2), etc.), then calculate L, and then Y'_CL=sqrt(L).

Because hardware area or processing cost (/power) is not unlimited, there can be short-cuts, e.g.:

$$\text{Sqrt}(\text{power}(K; 2) + \text{power}(L; 2)) =$$
$$\text{approximately max}(K, L) \text{ if max}(K, L) > 4*\min(K, L)$$

and=approximately (⅞)*max(K,L)+(½)*max(K,L) otherwise, for any numbers K and L.

Ergo, one can use this to directly calculate the Y_CL from the R'G'B'-values.

Although V is a quantity that grows with luminance L (or in the sqrt power representation with luma Y'), it is not trivially related to it, but it does have the useful property that it is a measure of closeness to the upper gamut boundary, and in particular that all colors on the gamut upper boundary have a maximal strength value V=1.0 (going above that boundary in case of brightening, the largest one of the color components, e.g. blue would need to go beyond its normalized maximum, e.g. B=1.1, which is mathematically possible, but physically impossible). The components numbered in the 500 s are similar as in FIG. 5, i.e. inter alia they do the "normal" color brightening, i.e. as specified in the luminance processing function FLM, and with the upper gamut area handling mechanism of the g-factor determination not on yet.

Let's suppose that the luminance processor of FIG. 6 is in a HDR decoder, which gets 5000 nit PB_C HDR encoded with YCbCr pixel colors as input (if they are encoded PQ based then the converter does the correct mathematics to convert to luminance, and linear RGB in the example), and derives e.g. a 900 nit MDR image and its luminances. The strength value V is also calculated and let's elucidate with the example where the linear color components are used, ergo V=max(R,G,B).

Now interestingly, the inventor realized that, although the mapping FLM as determined by the creation side is supposed to be applied to the luminance L of the pixel color (or a color processing of equivalent nature is actually performed like multiplying the linear RGB components with the same luminance-changing g-factor gL), it is interesting to apply it to the strength value V, because then with each color chromaticity one can see whether it will map above the gamut boundary.

Figure 7:
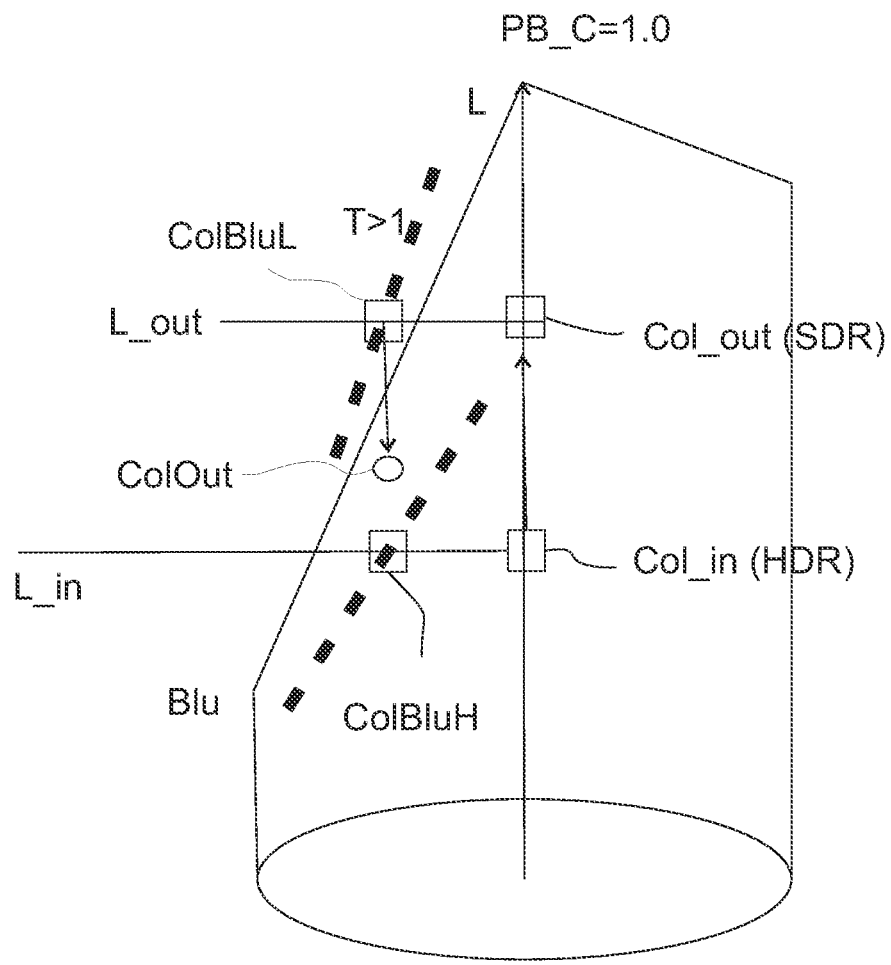
FIG. 7 shows part of the behavior of such a system, and in particular what FIG. 5 without the corrective elements of FIG. 6 would do, in a chromaticity-luminance color space.

This can be seen in FIG. 7. A luminance mapping is supposed to map the colors based on their luminance, irrespective of their chromaticities, hence we can check it for achromatic colors on the luminance axis. Suppose we have a certain color of an average luminance Col_in of the HDR input image, which becomes brightened to Col_out (e.g. to create an SDR or MDR image) because all colors need to brighten, especially the darker ones to still be able to reasonable see what is happening there in the movie in the lower dynamic range renderings, but those brightened colors will push all more luminous colors upwards also, because of the need to keep the luminance relationship in the two gradings, i.e. the output image versus the input image.

This brightening is quite unproblematic for achromatic grey colors, since Col_out seems to be still well inside the color gamut. However, if we draw horizontal lines of equi-luminance, we see that mapping a blue color ColBluH of the same luminance as the grey HDR colors Col_in to its LDR equivalent ColBluL, we would map above the color gamut, so something would need to happen in our processing, or the clipper will automatically clip at least one color component to 1.0, which would typically involve considerable chromaticity errors including potentially nasty hue errors.

However, by drawing equi-V lines (in thick dashes) one can see this situation, the input blue color ColBluH is still well in the gamut (e.g. V=0.8), but the output color ColBluL has e.g. V=1.2 ergo, it's above 1.0.

Now interestingly the linear V measure does behave similarly proportionally like L, so it can be seen to get transformed by the same g-factor:

If R_out = $gL*$R_in; G_out = $gL*$G_in; B_out = $gL*$B_in, then max(R_out, G_out, B_out) = $gL*$V_in.

So it is actually the value of gL*the (input) value of V which is calculated by 502 in FIG. 6 that is the criterion to watch, and this is calculated in the exemplary embodiment by multiplier 602, and the result is called the Test value T.

Subsequently gain factor modification unit 603 uses this value in a test to modify the initial gain value derived from the grading function FLM as locally determined by the receiver, or received from the content creation side typically together with the actual received images according to some image metadata coding formalism.

In the simplest embodiment the threshold G equals 1.0 (e.g. hard fixed in the luminance processor).

Then if the colors map to T=gL(color)*V(color)<=1.0, they actually map within gamut, and there is no problem, ergo, the mapping is good as it was, and the initial gains gL are passed unmodified as final gains gF for doing the actual HDR-to-MDR color change on the RGB components. Note that we added (color), to emphasized that both the gL factor calculated, and the V value depend on the color component values of the current pixel color.

However if T>G=1.0, then we have a gamut overflow problem, e.g. when gL*V equals 1.8.

In this case, a function F1(gL) has to be applied which guarantees that the mapped color (and simultaneously its V-value) maps inside the gamut, at least for most colors (except potentially if a Vmx value was determined, those few colors which are still allowed to clip).

A simple function which can be determined by the decoder (e.g. fixed in its luminance processor software or circuitry) may be the following for each possible out of gamut mapping gL(color)*V(color):

$$\text{If } T > G = 1.0 \text{ then } gF = gL*(1/T). \quad [\text{Eq. 3}]$$

In this case one indeed sees that if for some color the T value when mapping with the original gL factor for the output color is e.g. 1.3, then mapping the same input color (and its V value) with a different gF which is gL/1.3 will map exactly to one (and applying gF/1.8 for another color which maps to 1.8 will do the same etc.).

Of course, although chromaticity-preserving, this is a rather crude strategy (but easy to begin the explanation with) yet even suitable in some situations, but not so optimally working on more critical kinds of HDR image.

Thereto it may be advantageous to use a more complex mapping strategy which still retains differentiatability of the original luminance differences for all colors which initially mapped above the gamut boundary, by introducing (at least) a threshold value G. This threshold value can again be determined by the receiving side luminance processor, or, advantageously received and communicated to the gain factor modification unit 603 by data reception means (689) arranged to receive the threshold (G) from the creator of the content over a network (690), which the skilled reader can understand to be any present or future image or data delivery system, e.g. a satellite TV channel, the interne, or for prefixed packaged storage the G values for consecutive video images may even be stored e.g. on a blu-ray disk and accessed via a BD reader, etc.

Figure 10:
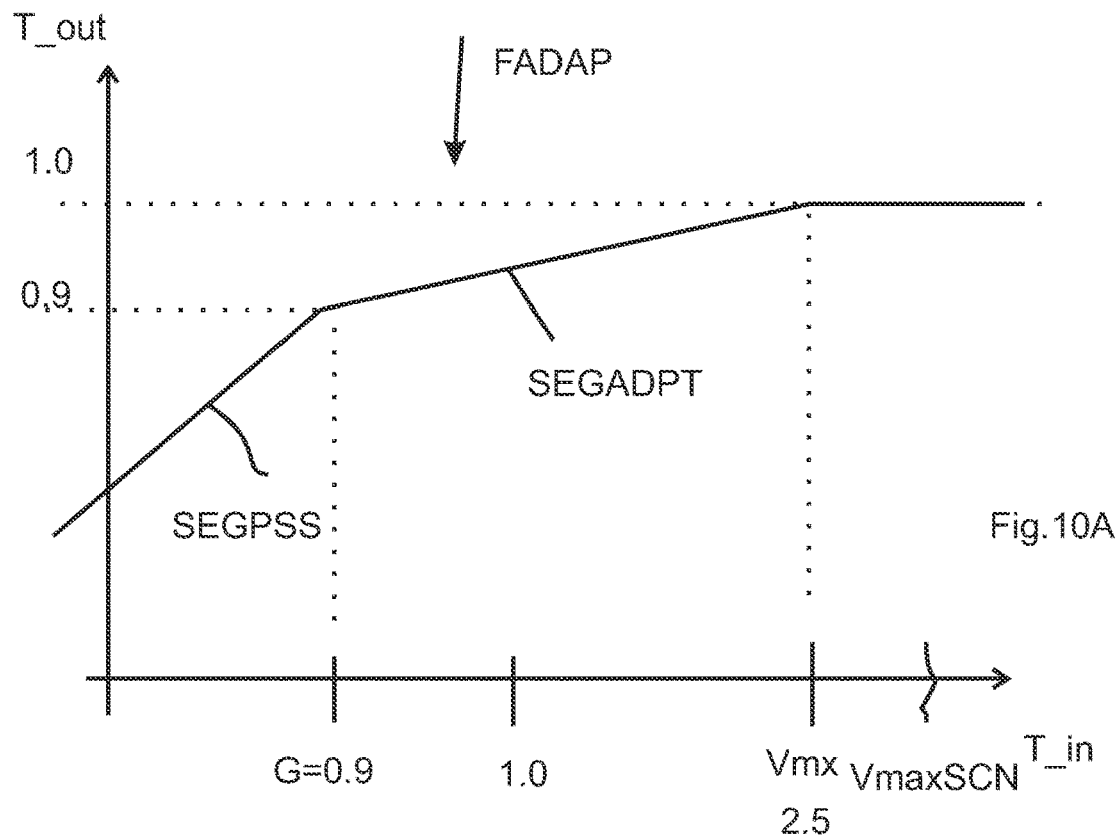
FIG. 10 schematically shows some examples for determining a corrective color mapping strategy for colors in an upper part of the color gamut, and the corresponding functions based on a strength value V being defined as the maximum one of the red, green and blue component of a color, which can according to the present teachings be formulated as a corresponding gain factor gF, in particular which may be a resultant gain factor which is a deviation of an initial gain factor, for colors near the top of the gamut only.
Figure 10:
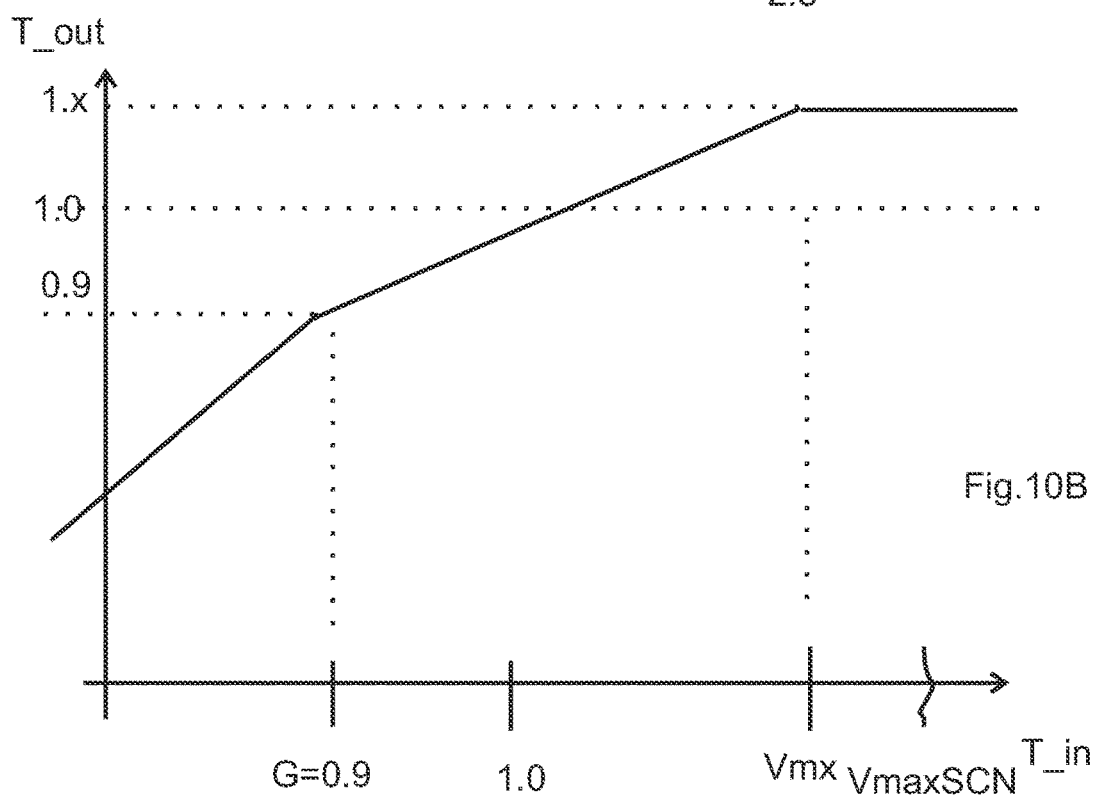

How the various gL-re-determination strategies/functions can be embodied is elucidated with FIG. 10. In FIG. 10A we show an example where the threshold G is set to 0.9, and a linear mapping up to Vmx. Actually, there may be a couple of colors (maybe only a fews tens of pixels) that have a gL*V value which becomes higher than Vmx up to the highest in the image, or run of successive images VmaxSCN, but those can be hard clipped to a color on the gamut top boundary with the same chromaticity as the HDR input color.

T_in is the V value of the mapped color with the initial gL factor, and we should have a final mapping with gF which yields T_out values up to 1.0, corresponding with the gamut boundary. Below 0.9, the gain factor is unchanged, hence the T_out value will also be identical to the T_in value (SEGPSS). The remapping between G and Vmx, can be formulated in many ways, and can be as simple as a linear segment (SEGADPT). The attenuation factor A can be easily calculated from a representation in this axis system, e.g. if the color 2.5 has to map to 1.0, we need to divide gL by 2.5, etc.

An example calculation equation for the attenuation A (the total attenuation in the luminance direction solely) is:

$$A(T) = (T > G?) \; 1/\{1 + [(Vmx - 1)/(Vmx - G)] * (T - G)\}: 1 \quad [\text{Eq. 4}]$$

It can be seen that if T=Vmx, then A(T) becomes 1/Vmx, etc.

Interestingly, FIG. 10B shows the situation in which part of the above gamut issue is solved by desaturation. In that case, the colors initially mapping to Vmx can map to y.x>1.0, e.g. 1.9 (probably not too far above the gamut boundary to not need too much desaturation), because that remainder of overflow is shown in the saturation direction.

Figure 8:
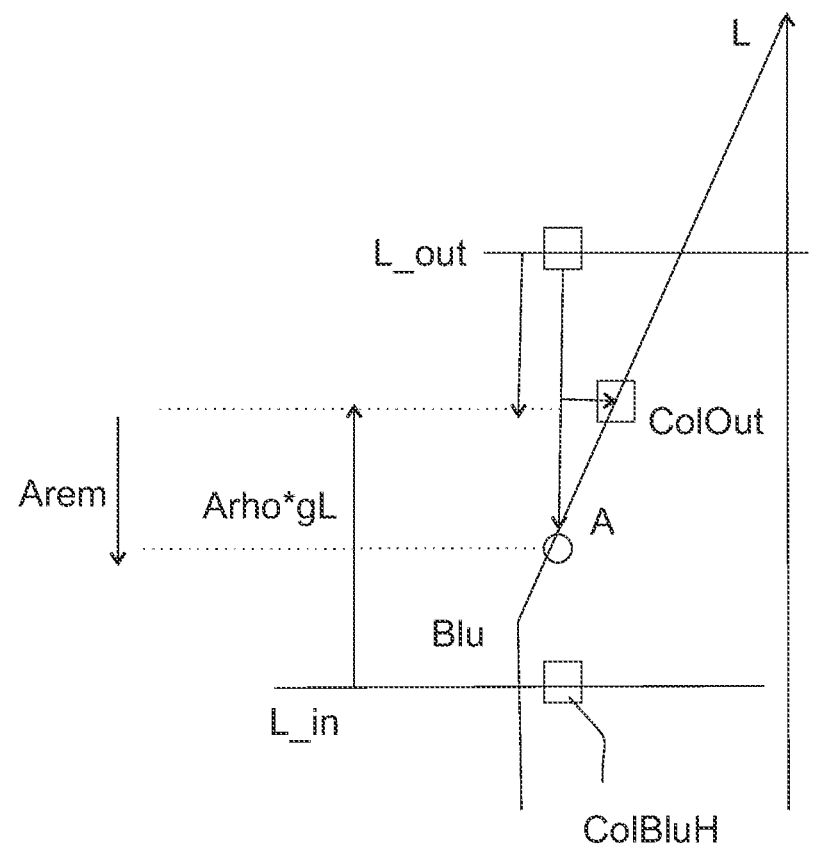
FIG. 8 shows the behavior of an advanced embodiment, which solves the problem of corrective mapping near the top of the color gamut of the output color space partially by means of a desaturation operation.

This is shown on the color gamut plot of FIG. 8. The total attenuation A would bring a mapped color to the gamut boundary. However, by defining the rho parameter as above one can map to a position in between, and then shift horizontally to ColOut by desaturating.

The rho parameter can be weighed to be an optimal amount between the deleterious effect of darkening versus the deleterious effect of desaturation, e.g. by the human grader position the slider 1101 on his preferred position between 0 and 1. Or some embodiments may have a fixed setting, e.g. rho=½, etc.

The multiplicative parameter needed in the desaturation can be calculated as follows:

$$S = (Vinterm * Arem - Y)/(Vinterm - Y) = (1 - Y)/(Vinterm - Y), \quad [\text{Eq. 5}]$$

where

Figure 9:
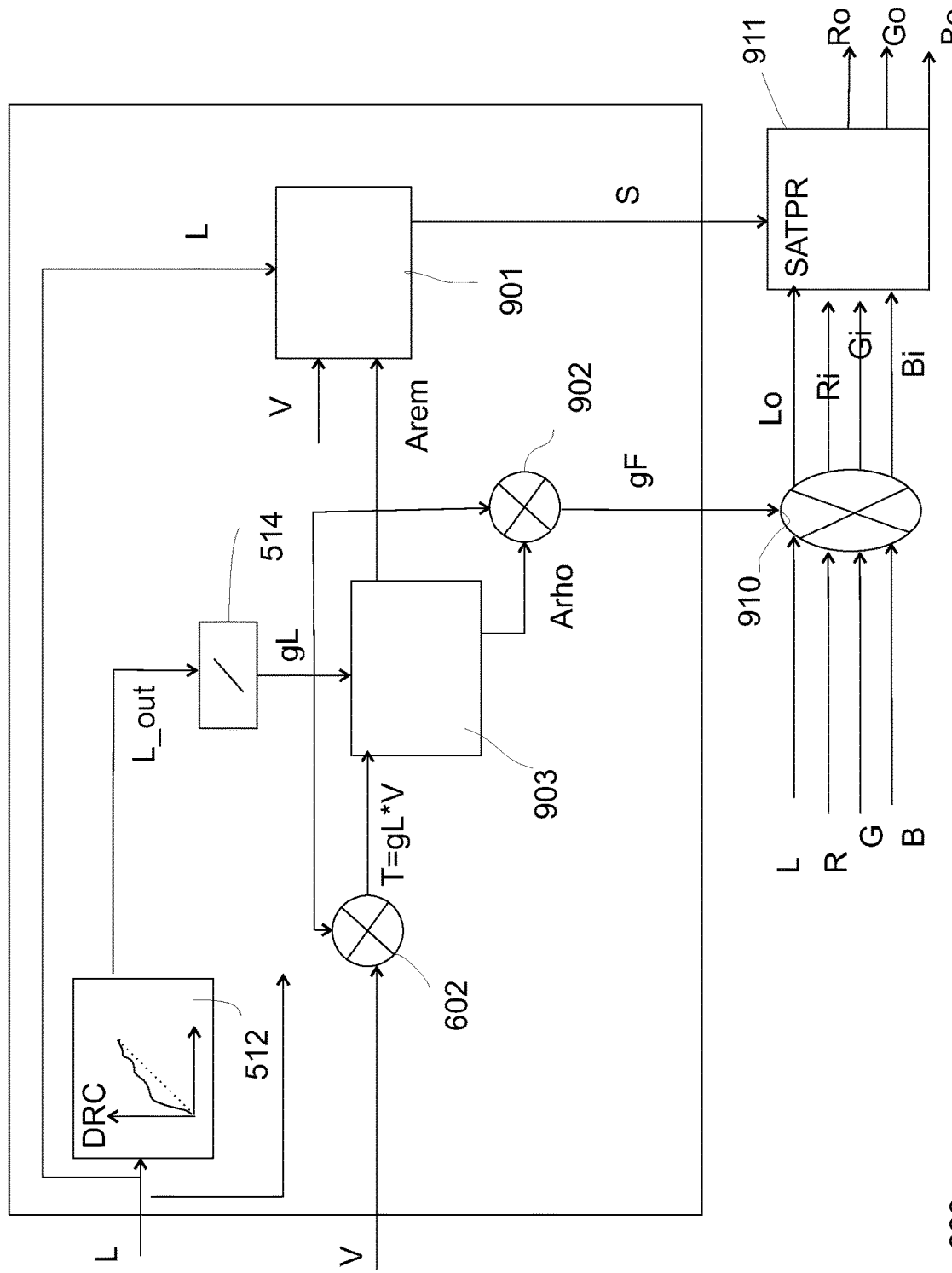
FIG. 9 generically and schematically shows an example of a luminance processor being part of a color processor also having a saturation processor.

Vinterm is the height still above the gamut boundary after doing the luminance dimming part, and Y is e.g. the intermediate luminance in the linear example (i.e. Li in FIG. 9). Of course more complex desaturation strategies can be used if desired (with non-constant S, i.e. a desaturation which can vary over color space), especially if they are communicated to the receiving side (at least reversible systems like the mode 2 HDR-as-SDR communication should know everything to reconstruct).

An example of a processing architecture (and advanced luminance processor embodiment connected to a saturation unit) in an encoder able to implement such a correction strategy is shown in FIG. 9. In principle one can elect to do the saturation processing and luminance processing in opposite order as desired, but for the order chosen the decoder should invert the order (so if the encoder first does luminance mapping and then desaturation, the reversed decoder will first do the corresponding resaturation and then the luminance mapping). Note that if one knows Vinterm and Y, one knows the S (whether for desaturation or resaturation) if one knows Arem, which is e.g. communicated from the creation side by means of the rho parameter.

The attenunation A(T) at the decoder side can be calculated as:

$$A(T) = (T > G)? \; \{1 - [(Vmx - 1)/(Vmx - G)] * G\} \quad [\text{Eq. 6}]$$
$$/\{1 - [(Vmx - 1)/(Vmx - G)] * T\}: 1$$

Partial mapping calculator 903 now determines an attenuation factor Arho to multiply by gL in multiplier 902 to obtain the appropriate final gF for partial luminance dimming, performed by multiplier 910 on the RGB trio together with the luminance which must become the intermediate luminance Li for the later desaturation step by desaturator 911. Saturation factor determination unit 901 can determine the needed saturation factor S(V,Y,Arem) e.g. according to Eq. 5, for saturation processor 911 to apply it, in a luminance preserving desaturation according to the equations 7:

$$Ro = Li + S * (Ri - Li); \; Go = Li + S * (Gi - Li); \; Bo = Li + S * (Bi - Li).$$

Those output color components are then the correct color components for the e.g. SDR color (or MDR color) derived from the HDR input image colors.

Note that the reader must understand that when downgrading in both encoder and decoder (i.e. the mode i situation in which actually the HDR image itself is communicated to receivers, typically with PQ-OETF-ed nonlinear R"G"B" values, or typically because the video coding will go through standard e.g. HEVC compression the corresponding YCbCr color components) both encoder and decoder will transform colors in the same downgrading direction, so there will be NO reversal of the order of color processing in the decoder (one can imagine the encoder to in this case only do the transformation for checking the later decoder behavior, with selected parameters choices).

However, in the reversible HDR image or video encoding, i.e. mode 2 encoding the images as SDR images, where the encoder creates those by downgrading, the decoder recreates a close approximation of the master HDR images by upgrading, i.e. in the opposite direction.

Figure 13:
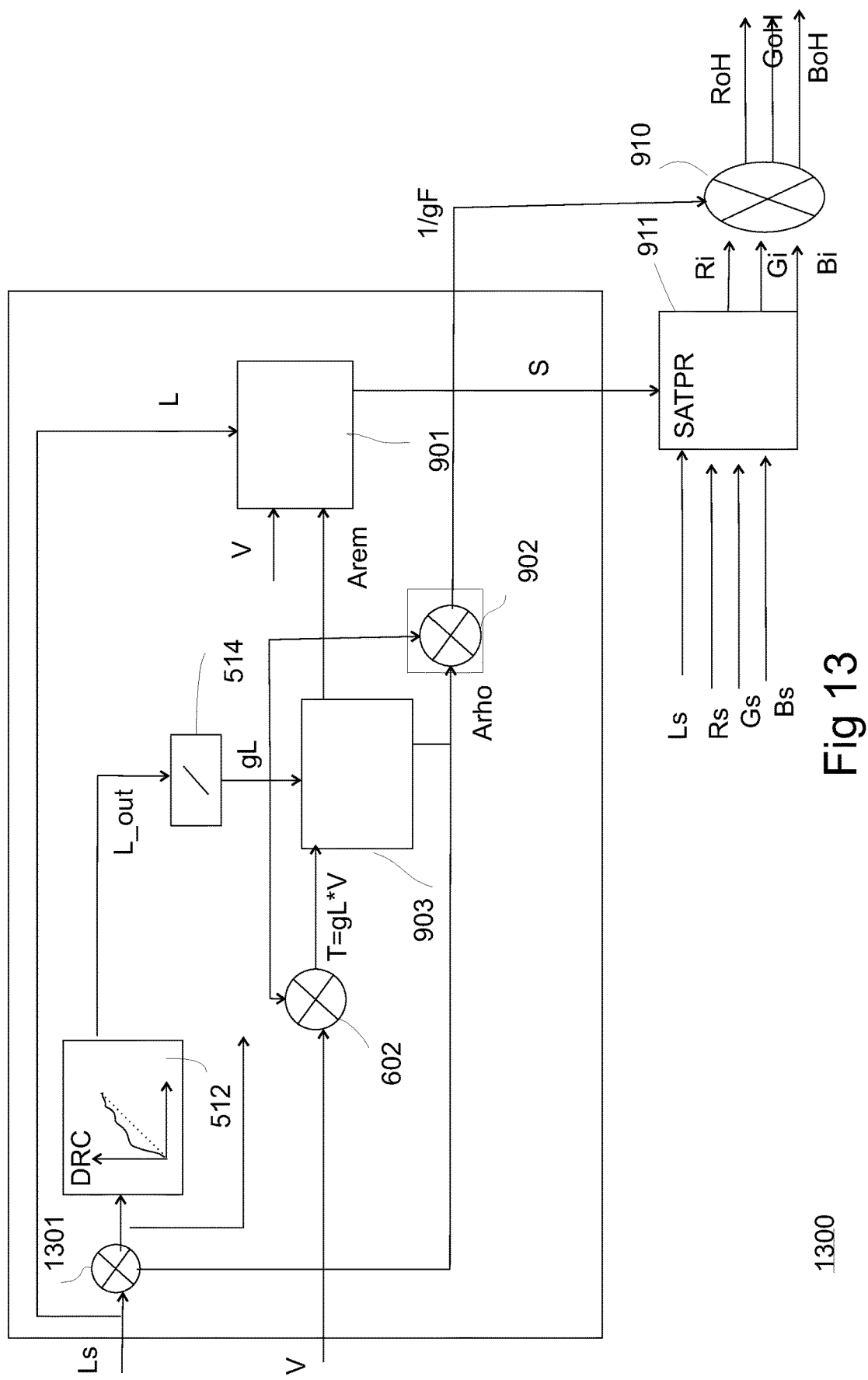
FIG. 13 elucidates a mode 2 decoder according to the present invention principles corresponding with the encoder of FIG. 9.

Then the decoder changes somewhat, as is explained with FIG. 13.

Note the opposite order of the saturation (911) and the brightening (multiplier 910), which now happens with 1/gF, but it is the same partial g-factor that lowered the initial above gamut color ColBluL to the intermediate luminance of the final color ColOut, that will be the intermediate result to luminance boost by that same factor again. We have now used the suffix s to indicate that in this scenario the input colors RsGsBs and luminance Ls are SDR colors, and the output colors RoH, GoH, BoH are of the reconstructed HDR image (according to the novel optimal treatment of the near gamut top critical colors). Note also the extra multiplier 1301, because the intermediate position of the luminance is not the initial position, and now it is used in the g-factor determination path.

Figure 11:
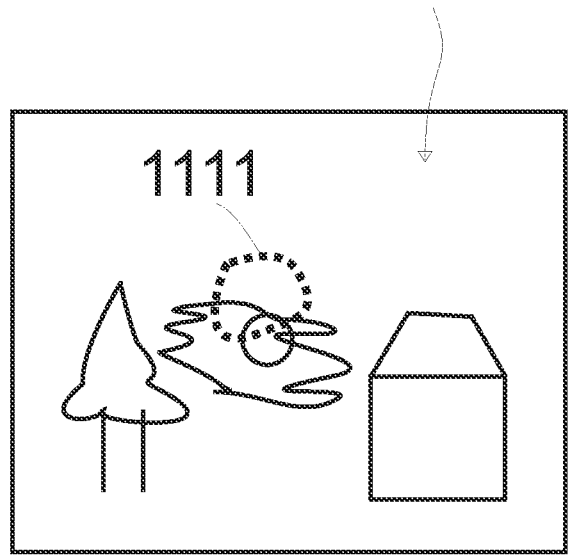
FIG. 11 shows a user interface which allows a human grader at a content creation side to specify a couple of simple but powerful parameters approximately guiding or exactly specifying the luminance and in general color processing of the bright near gamut top colors by a receiving side luminance processor of any of the variants according to the present invention's teachings.
Figure 11:
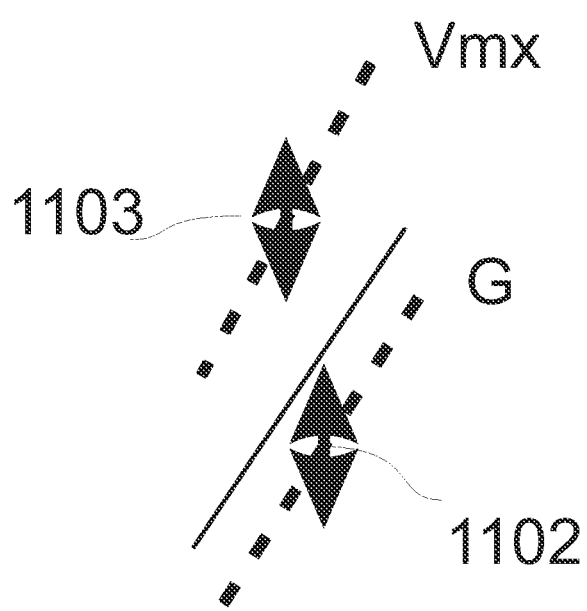
Figure 11:
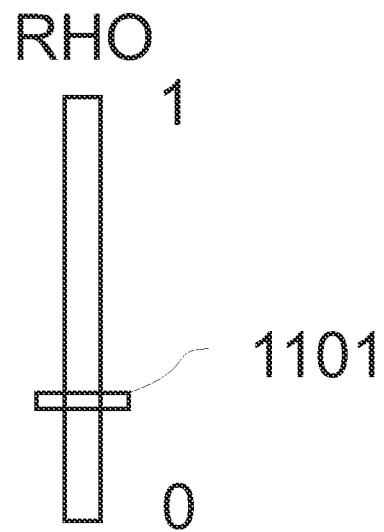

FIG. 11 shows an example of a user interface which can be used for a human grader to create the parameters, which can be as simple as just three values G, rho, and Vmx. Rho can e.g. be set by a slider, e.g. the automaton of a semi-automatic method determined that a setting 0.25 was optimal, but the user likes 0.2 or 0.3 better.

He has also two other shifters, 1103 resp. 1103 to set the Vmx and G value, e.g. on a color gamut plot. There may also be a view 1110 of the image being processed, e.g. a representative image of the HDR scene imaged in a shot of successive video images, on which there may be automatically generated indicators 1111 to quickly grab the grader's attention. E.g., the automaton has calculated that in this region (the sunlit clouds) a significant contrast reduction of the texture is happening (maybe even hard clipping), and the user interface can e.g. show a blinking red boundary around that region.

Figure 12:
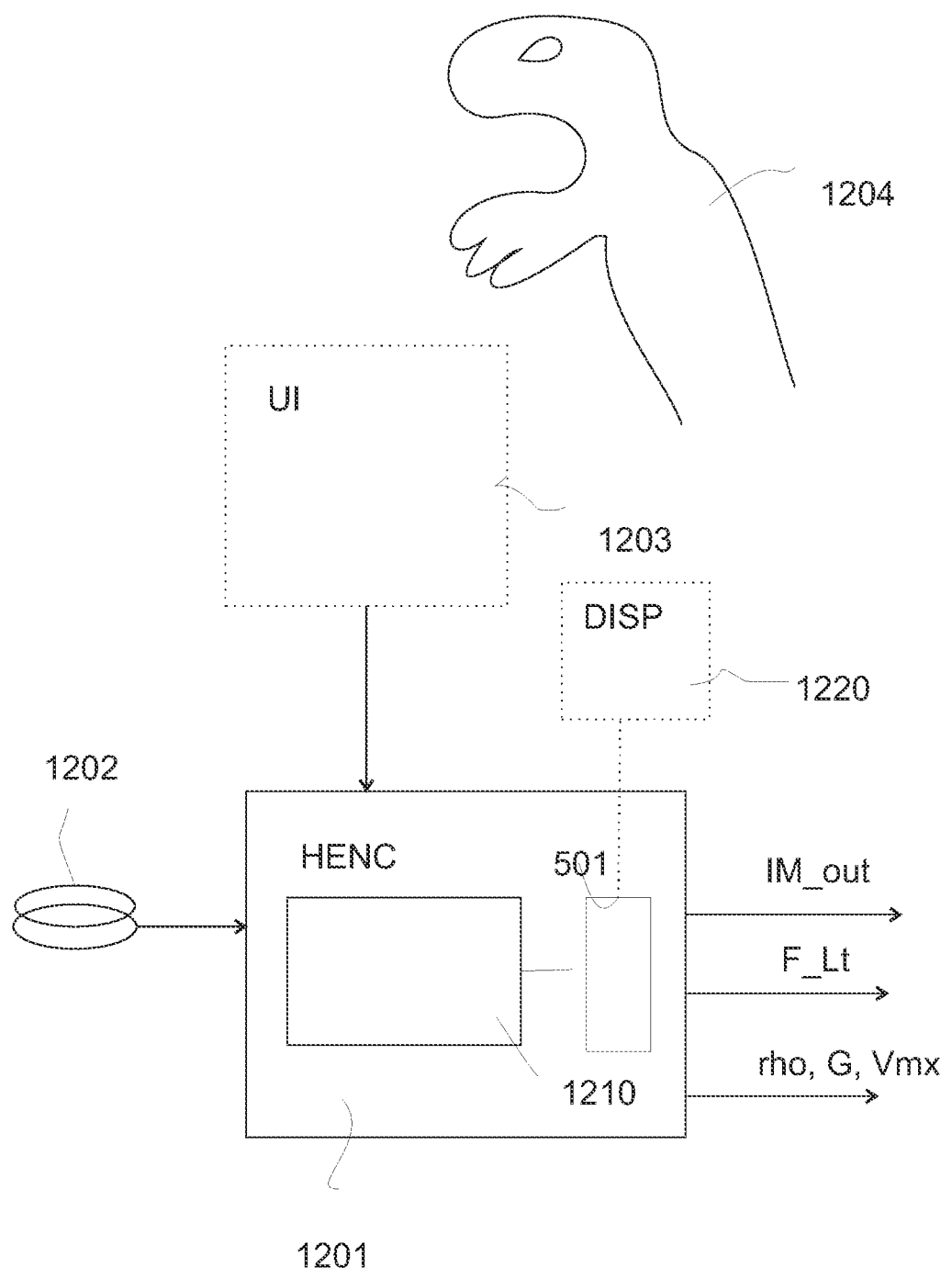
FIG. 12 schematically shows an example of possible automatic, semi-automatic, or manual encoders which yield the parameters needed for the decoding side luminance processor variations according to the taught embodiments.

FIG. 12 shows an example of an encoding system with encoder 1201 (which can both encode HDR images as according to any previously described mode, but also determine an output the present new parameters rho, G, Vmx, or a function to re-determine at a receiving side the g-factors), on which the content creating color grader 1204 can do his grading work, at least the determination of one parameter according to the present invention, e.g. G, or rho. He can check on display 1220 what is happening, because the luminance processor 501 applies the processing (i.e. directly downgrading in mode 1, and typically the whole encoding+ decoding chain comprising reversed upgrading in mode 2) to show the result of the grader's choice of e.g. rho via the user interface means 1203, which may typically be a grading panel, and software allocating e.g. the change of rho to a trackball. The images come from any image storage 1202, e.g. a hard disk on a server, etc., or in some cases even a real-time streaming. Image evaluation processor 1210 may do all kinds of image analysis to come to proposals of rho, G etc., and in automatic embodiments this will be the only unit determining those parameters.

A high dynamic range video encoder (1201) can use the luminance processor to help the human color grader to determine suitable values for the various parameters controlling any embodiment of his luminance changing algorithm (e.g. when comprised in a decoder receiving those parameters as control parameters in metadata over some data or video connection). To communicate any such control parameters the HDR video encoder may comprise:

an input for receiving an input image from an image source (1202);

an encoder for encoding the input image as an output image and at least one luminance mapping function (F_Lt);

an image evaluation processor (1210) arranged to analyse the color properties of an image of the video, to determine at least one of the parameters being: a) the threshold (G) indicating above which some alternative final gain gF should be used, and below which the original gain corresponding to the luminance mapping function FLM suitable for dynamic range re-grading of the present image given its object or pixel luminance distribution specifics, b) the function (FADAP) usable to determine an alternative gain for the brighter colors of the image to be processed, c) the clipping parameter (Vmx) indicating from which input luminance (after luminance regrading) clipping is allowed, but chromaticity-preserving clipping (in case such effect is desired) and d) the fraction value (rho) determining the split of the interval of correction towards the gamut to be handled by darkening versus desaturation, e.g. 40% of the luminance distance remaining after applying the final gF and to be processed by desaturation, to at least guarantee the conservation of the hue of the pixel's input color, and the encoder being arranged to output as metadata this at least one of the parameters. The skilled person can from all our present teachings understand how, similar to e.g. determining a suitable G-value, above which some correction has to be applied to the original FLM-based g-factor-determined luminance change (whether fully hue conserving or with some remaining hue error clipping, but typically small and far less than when not applying the present above-gamut correction principles), e.g. by a human looking a how much of a sunlit evening sky with clouds can be deteriorated in the manner set (e.g. with a pre-agreed simple strategy which the encoding side knows that the decoding side will apply in case no better FADAP is communicated), also the other parameters can be determined. E.g., the human color grader can use the UI to draw a shape of the upper part of the FADAP function to use to determine the gF values for the brightest colors, so that they e.g. don't darken too much at least some image colors or don't reduce at least some luminances which some pixels in some parts of the clouds have in manner which deteriorates the visible texture of such cloud too much etc. Also an automaton may judge to apply some clipping, based on calculating e.g. contrasts over various sets of connected pixels in an estimated to be interesting or critical region, such as said clouds (which may be identified based on e.g. other texture measures, such as a low business measure, which indicates that smooth gradients in the sky may more easily show artifacts than high frequency multicolored texture regions such as a flowerbed seen from distance, etc.). But in case the encoder purely uses automatic image analysis algorithms, it need not comprise a luminance processor for actually showing any chosen result to the video content creating human.

Similarly a method of luminance processing may comprise receiving from the creator of the content over any connected network (network clearly being usable in the broadest sense) at least one of the parameters being: a) the threshold (G), the function (FADAP), the clipping parameter (Vmx) and the fraction value (rho) separate or in any combination of parameters depending on the needs of the specific luminance changing embodiment, and apply such at least one parameter in its luminance calculation.

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection—wired or wireless—, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. A luminance processor, comprising:
    a gain determination circuit,
        wherein the gain determination circuit is arranged to determine an initial multiplication factor,
        wherein the initial multiplication factor is an output of a luminance mapping function divided by an input luminance of an input color of an input pixel of an input image,
        wherein the output of the luminance mapping function is a result of applying the input luminance to the luminance mapping function,
        wherein the input image has a first dynamic range,
        wherein the first dynamic range has a first peak luminance,
        wherein the luminance mapping function indicates how to adjust the input luminance to obtain an intermediate luminance of a second image,
        wherein the second image has a second dynamic range,
        wherein the second dynamic range has a second peak luminance,
        wherein the second peak luminance divided is different from the first peak luminance;
    an overflow determination circuit,
        wherein the overflow determination circuit is arranged to determine an overflow,
        wherein the overflow is determined as a product of the initial multiplication factor and a largest color component of the input color;
    a gain factor modification circuit,
        wherein the gain factor modification circuit is arranged to determine an alternative multiplication factor,
        wherein the alternative multiplication factor is less than the initial multiplication factor,
        wherein the gain factor modification circuit is arranged to output the alternative multiplication factor as a final multiplication factor when the overflow is greater than a threshold,
        wherein the gain factor modification circuit is arranged to output the initial multiplication factor as the final multiplication factor when the overflow is less than or equal to the threshold; and
    a multiplier circuit,
        wherein the multiplier circuit is arranged to multiply input color components of the input color by the final multiplication factor so as to obtain an output color.

2. The luminance processor as claimed in claim 1, wherein the threshold is received as metadata, wherein the metadata is associated with the input image.

3. The luminance processor as claimed in claim 2, wherein the threshold is received from an encoder circuit.

4. The luminance processor as claimed in claim 1, further comprising a data reception circuit,
    wherein the data reception circuit is arranged to receive the threshold from an encoder circuit,
    wherein the threshold is received from the encoder circuit as metadata, wherein the metadata is associated with the input image.

5. The luminance processor as claimed in claim 1, further comprising a partial mapping determination circuit,
    wherein the partial mapping determination circuit is arranged to determine a first fraction of correction of the input color,
    wherein the first faction of correction of the input color specifies an amount of luminance reduction towards an upper gamut boundary at the chromaticity position of the input color,
    wherein the first fraction of correction is based on multiplication of the input luminance by the final multiplication factor,
    wherein the partial mapping determination circuit is arranged to determine a second fraction of correction,
    wherein the second fraction of correction specifies a correction by a pixel color saturation change.

6. The luminance processor as claimed in claim 5, further comprising a data reception circuit,
    wherein the data reception circuit is arranged to receive a fraction value,
    wherein the first fraction of correction and the second fraction of correction are based on the fraction value.

7. The luminance processor as claimed in claim 1,
wherein the luminance processor establishes intermediate red, green and blue color components based on the intermediate luminance,
wherein the overflow measure is determined based on a largest value of the intermediate red, green and blue color components.

8. A video encoder, comprising:
an input circuit,
   wherein the input circuit is arranged to receive an input image;
   wherein the input image comprises pixel luminances,
   wherein the pixel luminances lie in an input dynamic range,
   wherein the input dynamic range is bounded by an input peak luminance;
an establishment circuit,
   wherein the establishment circuit is arranged to establish a luminance mapping function;
an image evaluation processor circuit,
   wherein the image evaluation processor circuit comprises a luminance processor,
   wherein the luminance processor comprises:
      a gain determination circuit,
         wherein the gain determination circuit is arranged to determine an initial multiplication factor,
         wherein the initial multiplication factor, is an output of the luminance mapping function divided by an input luminance of an input color of an input pixel of the input image,
         wherein the output of the luminance mapping function is a result of applying the input luminance to the luminance mapping function,
         wherein the luminance mapping function indicates how to adjust the input luminance to obtain an intermediate luminance of a second image,
         wherein the second image has a second dynamic range,
         wherein the second dynamic range has a second peak luminance,
         wherein the second peak luminance is different from the input peak luminance;
      an overflow determination circuit,
         wherein the overflow determination circuit is arranged to determine an overflow,
         wherein the overflow is determined as a product of the initial multiplication factor and a largest color component of the input color;
      a gain factor modification circuit,
         wherein the gain factor modification circuit is arranged to determine an alternative multiplication factor, wherein the alternative multiplication factor is less than the initial multiplication factor,
         wherein the gain factor modification circuit is arranged to output the alternative multiplication factor as a final multiplication factor when the overflow is greater than a threshold,
         wherein the gain factor modification circuit is arranged to output the initial multiplication factor as the final multiplication factor when the overflow is less than or equal to the threshold, and
      a multiplier circuit,
         wherein the multiplier circuit is arranged to multiply input color components of the input color by the final multiplication factor to obtain second color components of the second image,
   wherein the image evaluation processor circuit is arranged to establish a value of the threshold,
an image output circuit,
   wherein the image output circuit is arranged to output the second image, and
a metadata output circuit,
   wherein the metadata output circuit is arranged to output the luminance mapping function and the established value of the threshold.

9. A video decoder, comprising:
an input image input circuit,
   wherein the input image input circuit is arranged to receive an input image;
a metadata input circuit, wherein the metadata input circuit is arranged to receive a luminance mapping function and a threshold,
a luminance processor, comprising:
   a gain determination circuit,
      wherein the gain determination circuit is arranged to determine an initial multiplication factor,
      wherein the initial multiplication factor is an output of the luminance mapping function divided by an input luminance of an input color of an input pixel of an input image,
      wherein the output of the luminance mapping function is a result of applying the input luminance to the luminance mapping function,
      wherein the input image has an input dynamic range,
      wherein the input dynamic range has an input peak luminance,
      wherein the luminance mapping function maps the input luminance to an intermediate luminance of a second image,
      wherein the second image has a second dynamic range,
      wherein the second dynamic range has a second peak luminance,
      wherein the second peak luminance is different from the first peak luminance;
   an overflow determination circuit,
      wherein the overflow determination circuit is arranged to determine an overflow,
      wherein the overflow is determined as a product of the initial multiplication factor and a largest color component of the input color;
   a gain factor modification circuit,
      wherein the gain factor modification circuit is arranged to determine an alternative multiplication factor,
      wherein the alternative multiplication factor is lower than the initial multiplication factor,
      wherein the gain factor modification circuit is arranged to output the alternative multiplication factor as a final multiplication factor when the overflow is greater than the threshold,
      wherein the gain factor modification circuit is arranged to output the initial multiplication factor as the final multiplication factor when the overflow is less than or equal to the threshold, and
   a multiplier circuit,
      wherein the multiplier circuit is arranged to multiply input color components of the input color by the final multiplication factor to obtain second color components of the second image.

10. A method, comprising:
determining an initial multiplication factor,
wherein the initial multiplication factor is an output of a luminance mapping function divided by an input luminance of an input color of an input pixel of an input image,
wherein the output of the luminance mapping function is a result of applying the input luminance to the luminance mapping function,
wherein the input image has a first peak luminance,
wherein the luminance mapping function indicates how to adjust the input luminance to obtain an intermediate luminance of a second image,
wherein the second image has a second peak luminance,
determining an overflow,
wherein the overflow is determined as a product of the initial multiplication factor and a largest color component of the input color;
determining an alternative multiplication factor,
wherein the alternative multiplication factor is less than the initial multiplication factor,
wherein a final multiplication factor is set equal to the alternative multiplication factor when the overflow is greater than a threshold,
wherein the final multiplication factor is set equal to the initial multiplication factor when the overflow is less than or equal to the threshold; and
multiplying input color components of the input color by the final multiplication factor so as to obtain an output color.

11. The method of claim 10,
wherein threshold is received as metadata,
wherein the metadata is associated with the input image.

12. The method of claim 10, further comprising receiving the threshold from an encoder circuit.

13. The method of claim 10, further comprising receive a clipping parameter,
wherein the clipping parameter is defined as a maximum of the red, green and blue color components of the output color; and
specifying that hue-preserving color clipping is permitted if a color luminance is greater than the clipping parameter.

14. The method of claim 10, further comprising:
determining a first fraction of correction of the input color,
wherein the first faction of correction of the input color specifies an amount of correction by luminance towards an upper gamut boundary at a chromaticity position of the input color,
wherein the first fraction of correction is obtained by multiplication of color components of the input color by the final multiplication factor; and
determining a second fraction of correction,
wherein a saturation multiplier is based on the second fraction of correction,
wherein saturation processing of the input color is based on the saturation multiplier.

15. The method of claim 14, further comprising receiving a fraction value,
wherein the first fraction of correction and the second fraction of correction are based on the fraction value.

16. The method of claim 10, further comprising:
multiplying red, green and blue color components of the input pixels by the initial multiplication factor; and
determining the overflow based on a largest value of the red, green and blue color components.

17. The method of claim 10, further comprising receiving the luminance mapping function in metadata.

18. The method of claim 17, further comprising receiving the luminance mapping function from an encoder circuit.

19. The method of claim 18, wherein the luminance mapping function is created by a creator of the input image.

20. The method of claim 12, wherein the threshold is created by a creator of the input image.

21. The luminance processor as claimed in claim 1, wherein the final multiplication factor for intermediate luminances greater than the threshold has a value which is a function of the initial multiplication factor.

22. The luminance processor as claimed in claim 21,
wherein the function of the initial multiplication factor is a linear function,
wherein the linear function has a slope, wherein the slope is less than one.

23. The luminance processor as claimed in claim 3, wherein the threshold is created by a creator of the input image.

24. The video encoder as claimed in claim 9, comprising a color transformer circuit,
wherein the color transformer circuit is arranged to determine the second image on the basis of the input image,
wherein the first peak luminance is less than the input peak luminance.

* * * * *